US012217621B2

(12) United States Patent
Humphrey et al.

(10) Patent No.: US 12,217,621 B2
(45) Date of Patent: Feb. 4, 2025

(54) FACILITATING A SOCIAL NETWORK OF A GROUP OF PERFORMERS

(71) Applicant: JAMMIT, INC., Huntington Beach, CA (US)

(72) Inventors: Scott Humphrey, Huntington Beach, CA (US); Frank Gryner, St. Marys (CA)

(73) Assignee: JAMMIT, INC., Huntington Beach, CA (US)

( * ) Notice: Subject to any disclaimer, the term of this patent is extended or adjusted under 35 U.S.C. 154(b) by 0 days.

(21) Appl. No.: 18/414,150

(22) Filed: Jan. 16, 2024

(65) Prior Publication Data

US 2024/0153401 A1 May 9, 2024

Related U.S. Application Data

(63) Continuation of application No. 17/342,987, filed on Jun. 9, 2021, now Pat. No. 11,908,339, which is a continuation of application No. 16/195,651, filed on Nov. 19, 2018, now Pat. No. 11,081,019, which is a continuation of application No. 15/945,575, filed on Apr. 4, 2018, now Pat. No. 10,170,017, which is a continuation of application No. 15/673,910, filed on Aug. 10, 2017, now Pat. No. 9,959,779, which is a continuation of application No. 14/465,032, filed on Aug. 21, 2014, now Pat. No. 9,761,151, which is a
(Continued)

(51) Int. Cl.
*G09B 19/00* (2006.01)
*G06Q 50/20* (2012.01)
*G09B 5/06* (2006.01)
*G09B 15/04* (2006.01)
*G09B 19/04* (2006.01)

(52) U.S. Cl.
CPC ........ *G09B 19/0015* (2013.01); *G06Q 50/20* (2013.01); *G09B 5/065* (2013.01); *G09B 15/04* (2013.01); *G09B 19/00* (2013.01)

(58) Field of Classification Search
None
See application file for complete search history.

(56) References Cited

FOREIGN PATENT DOCUMENTS

WO WO-2009105259 A1 * 8/2009 ............. G06Q 50/00

OTHER PUBLICATIONS

Humphrey.*

* cited by examiner

*Primary Examiner* — James B Hull
(74) *Attorney, Agent, or Firm* — Brian S. Boyer; SYNDICATED LAW, PC

(57) ABSTRACT

The systems and methods taught herein are generally directed to facilitating a social network of a group of performers that occurs in a distributed computing environment having remote processing devices linked through a communications network in a streaming audio/video setting, including a dynamic point referencing of an audiovisual performance for an accurate and precise selection and controlled cycling of portions of the performance. The dynamic point referencing can be used by a learning artist, for example, in analyzing or performing a portion of the work through an accurate and precise digital audio/video instructional method having the controlled cycling feature. Such systems and methods will be appreciated, for example, by musicians, dancers, and other enthusiasts of the performing arts.

30 Claims, 22 Drawing Sheets

Related U.S. Application Data continuation of application No. 13/274,293, filed on Oct. 14, 2011, now Pat. No. 8,847,053.

(60) Provisional application No. 61/455,176, filed on Oct. 15, 2010.

FACILITATING A SOCIAL NETWORK OF A GROUP OF PERFORMERS

CROSS REFERENCE TO RELATED APPLICATIONS

This application is a continuation of U.S. application Ser. No. 17/342,987, filed Jun. 9, 2021, which is a continuation of U.S. application Ser. No. 16/195,651, filed Nov. 19, 2018, now U.S. Pat. No. 11,081,019, which is a continuation of U.S. application Ser. No. 15/945,575, filed Apr. 4, 2018, now U.S. Pat. No. 10,170,017, which is a continuation of U.S. application Ser. No. 15/673,910, filed Aug. 10, 2017, now U.S. Pat. No. 9,959,779, which is a continuation of U.S. application Ser. No. 14/465,032, filed Aug. 21, 2014, now U.S. Pat. No. 9,761,151, which is a continuation of U.S. application Ser. No. 13/274,293, filed Oct. 14, 2011, now U.S. Pat. No. 8,847,053, which claims the benefit of U.S. Provisional Patent application Ser. No. 61/455,176, filed Oct. 15, 2010, each of which is hereby incorporated herein by reference in its entirety.

BACKGROUND

Field of the Invention

The systems and methods taught herein are generally directed to a dynamic point referencing of an audiovisual performance for an accurate and precise selection and controlled cycling of portions of the performance.

Description of the Related Art

Any performing artist can appreciate rhythm and timing, as well as the fact that many skills can be handed down from one artist to the next, whether the artists are aspiring or seasoned. Such performing artists can include, for example, musicians, actors, dancers, and the like, and will appreciate the teachings set-forth herein. Even the smallest inflections of a note's volume, attack, and length, for example, can represent some of the many reasons why one player could be considered more accomplished than another.

Performing artists currently use instructional DVD's or streaming video to hone their skillset, learn new material, or acquire new skills. However, the problem remains that conventional video playback devices and internet streaming players lack the ability of a transport system that can give a user the type accuracy, precision, and control to quickly identify and repeat sections that are difficult to learn. Traditional video playback systems simply do not provide a method to accurately and precisely control and cycle sections of a video playback in a rhythmic and desirable manner. The technology to do so is currently unavailable, for at least the reason that the performing arts tend to have at least minor inconsistencies, as well as often complex and variable timing, associated with a performance, making it difficult to automate the parsing of the very unpredictable and highly detailed structure of the performance. It should be noted that even the slightest inconsistencies or variations in the timing of a performance make it very difficult, and in some case seemingly impossible, to automate the parsing of the performance.

A problem in the art includes learning how to emulate subtleties, such as gestures, body movements, and hand positions, and the like, and then identifying the desired portion of a performance having the subtlety, as well as accurately and precisely selecting and practicing the desired portion until it is learned. The guitar, for example, as well as other stringed instruments, is prone to subtle variations of the vibrato on the strings, which can make performances unique from one player to the next. Any musical instrument, or dance, can be subject to such subtleties where dance, of course, can be seen as directed to the aesthetics of combinations of body movements that follow a piece of music. Drummers, percussionists, and other types of rhythm instruments also include subtleties, for example, which may not be apparent to the layman but can again be a determining factor as to why one musician may sound more accomplished. One of skill in any performing art can appreciate the fact that such subtleties can occur quickly, and a tool that helps them identify and view the subtlety would be very helpful in developing or honing a skill.

In a desirable learning environment, a performer could easily, as well as accurately and precisely, select a desired portion of an audio/video file, repeatedly cycle the desired portion, adjust the tempo of the desired portion according to the performer's skill level to make the learning process easier, select one or more additional desired portions as needed to learn the piece, and observing each desired portion at the adjusted tempo. Musicians try to achieve this type of system, makeshift, using the only tools they have available currently. For example, a musician may try to learn a section of a musical piece with video assistance by trying to set a cycle point on their DVD player, media player, video editing software or video stream, but this usually results in many failed, and highly frustrating, attempts at accurately selecting a particular section of the work that they are learning. There is no system available, even a professional editing system, that provides a transport mechanism that can quickly, accurately, and precisely select a particular, desirable rhythmical portion of an audiovisual performance, whether the performance varies by a minor amount or dramatically in tempo throughout the performance. As such, it's apparent that the learning artist is currently highly frustrated in his attempts at establishing a repetitive section that repeats in a rhythmic pattern. To add to the frustration, the user has to deal with this problem repeatedly while moving through a work, selecting each desired portion as he moves his way through the process of learning how to perform the entire work.

The above features can be somewhat achieved in a live environment, where the learning is done real-time with a live teacher, although the accuracy and precision of the playback of the desired portion, the tempo of the playback, and the cycling is limited to human error and tolerance in the live environment. Unfortunately, not all musicians have readily available access to the live teaching environment and, moreover, those that may have such access will not likely have the flexibility or frequency of access that they may want. Moreover, access to instruction regarding a particular performance by a popular artist may be entirely unavailable.

Visual displays are an effective way for a performing artist to learn, and this is particularly true for performing artists that cannot read music, for example, or don't have access to a teacher. Visual demonstrations can provide a performing artist with general techniques, such as how to hold an instrument, hand positions, and body positions, as well as detailed information about fingering, nuances, and other techniques used by performers. Moreover, subjective details in musical notation, for example, can also be observed while watching an accomplished performing artist.

Currently, no system offers these features while also providing the function of observing a desired portion of a performance while rhythmically cycled at an adjusted tempo. Generally speaking, those of skill in the art of teaching movements that relate to a performing art would appreciate a system that allows a user to select and view a performer's actions according to a desired portion of performance, particularly where the desired portion contains difficult passages having many actions in rapid succession, perhaps moving too quickly for the user to otherwise comprehend. As such, the system could find application in teaching any performing art such as, for example, musicians or dancers.

Accordingly, one of skill will appreciate having a learning tool that provides a unique and effective way to, at least, (i) learn intricate interpretations of a performance; (ii) learn skills that can be variable from performer to performer; (iii) make an accurate and precise selection of repetitive cycling points of a desired audiovisual portion of a performance; (iv) help those that cannot read music to identify, isolate, set rhythmical cycling points, and practice portions of a musical work they are trying to learn, whether these portions are found in individual notes, beats, bars, or otherwise; (v) quickly reference and mark different sections of a work; (vi) select repetitive cycle points that snap to a tempo/index grid, and easily adjustable to additional cycling points; (vii) slow the audiovisual display down to a comfortable speed without changing the pitch; and, (viii) use the step advance mode to move between pre-selected beats or subdivided beats.

SUMMARY

The systems and methods taught herein are generally directed to a dynamic point referencing of an audiovisual performance for an accurate and precise selection and controlled cycling of portions of the performance. The dynamic point referencing can be used by a user in analyzing or performing a portion of the work through an accurate and precise digital audio/video instructional method having the controlled cycling feature. Such systems and methods will be appreciated, for example, by musicians, dancers, and other enthusiasts of the performing arts.

In some embodiments, the teachings are directed to an instructional audiovisual work for teaching a user how to perform at least a portion of the work through an accurate and precise audiovisual method. In these embodiments, the work comprises a video portion and an audio portion, wherein the work includes a performance by a performing artist. The work can also comprise a dynamic point reference within the work for an accurate and precise selection and point-cycling of a desired portion of the work by the user. In some embodiments, the dynamic point reference includes a tempo map of the audio portion that is adaptable for a plurality of tempos within the work.

The performer can be an amateur or a professional. For example, the performer can be a popular artist, in some embodiments. Likewise, the work can be an amateur work or a professional work. And, the work can be an original, popular musical work in some embodiments.

An advantage of the teachings provided herein is the accuracy and precision available in the selection of a desired portion. Due to this advantage, the cycling can include any selected time-frame within the work, such as a period of silence in an audio track, or any one or any series of sounds, beats, and bars. In some embodiments, the cycling can consist of a single musical note, a single repeating rhythmic pattern, or a series of accurate and precise selections from a tempo map. Each selection in the series of selections can consist of silence, a musical note, a plurality of beats, a bar, a plurality of bars, a repeating rhythmic pattern, or any combination thereof. In some embodiments, a visual portion of the work can provide a point of reference for the cycling such as, for example, during a period of silence in the work, or where an audio portion of the work is otherwise insufficient to establish a point of reference for the cycling, such as where the audio portion is damaged or ineffective.

In some embodiments, the dynamic point reference can function to facilitate a series of accurate and precise selections from the tempo map, each selection in the series of selections can consist of, for example, a musical note, a plurality of beats, a bar, a plurality of bars, a repeating rhythmic pattern, or any combination thereof. The series of selections can be learned piecewise by a user to learn an entire work. In some embodiments, the video can include a plurality of instructional views of the performing artist performing the work for selection by the user.

In some embodiments, an audio portion of the work can include a multi-track audio portion comprising an isolated audio track consisting of a solo performance that was not obtained through a process of subtracting the solo performance from a mixture of performances. In some embodiments, an audio portion of the work can include a multi-track audio portion comprising a plurality of isolated audio tracks consisting of a plurality of solo performances that were not obtained through a process of subtracting the solo performances from a mixture of the performances.

In some embodiments, the teachings herein include the development of a tempo map, and the tempo map can comprise a mapping of a complex tempo. In some embodiments, for example, the teachings are directed to a method of creating the instructional work. Such methods can include selecting the work; and, mapping the audio portion of the work to create a dynamic point reference. The dynamic point reference is used to facilitate an accurate and precise selection, and point-cycling, of a desired portion of the work.

In some embodiments, the teachings are directed to a method for a user to learn a performance through an accurate and precise audiovisual instructional process. In these embodiments, the method can include obtaining an audiovisual work having an audio portion, a video portion, and a dynamic point reference for selecting a desired portion of the audiovisual work. The method can also include selecting the desired portion of the work using the dynamic point reference and emulating the performance. The method can also include point-cycling the desired portion until the desired portion is learned to a satisfaction of the user.

In some embodiments, the performance is an audiovisual performance of a musical work; wherein, the work has a multi-track audio file derived from a multi-track audio recording. In these embodiments, the multi-track audio file can comprise an isolated instrument audio track and a residual component track. The isolated instrument audio track can comprise, for example, a single musical instrument playing a preselected piece of music that the user desires to learn on a preselected musical instrument. In these embodiments, the emulating can include transforming the composition of the multi-track audio file to include a gain ratio of volumes of (i) the isolated instrument audio track to (ii) the residual component track, wherein the residual component track represents a subtraction of the isolated instrument audio track from the plurality of audio tracks. The gain ratio can be selected by the user and, in some embodiments, the gain ratio is a ratio of track volumes that is greater than or equal to 0. In addition to the transforming, the emulating can include selecting the desired portion, watching the video, listening to the isolated instrument audio track in the desired portion, and playing the preselected musical instrument to emulate the desired portion. And, in some embodiments, the emulating further comprises reading a digital musical transcription and tablature display, such as an animated motion graphic or cartoon, of an instrument or performance, to a graphical user interface. Such data can correspond to the isolated instrument audio track. In some embodiments, the custom digital audio file further comprises an audible dynamic point reference track. As such, the emulating can also include listening to the audible dynamic point-reference track that is designed for the preselected piece of music. In some embodiments, the playback speed can be controlled, or the tempo adjusted, such that the desired portion plays back at a desired speed that matches the ability of the user.

In some embodiments, the method further comprises recording the emulated instrument audio track on a non-transitory computer readable storage medium; combining the emulated instrument audio track with the residual component track to create an educational audio file; comparing the user's emulated instrument audio track to that of the performer's isolated audio track; and, repeating the emulating, recording, combining, and comparing until the user has learned the preselected piece of music on the preselected musical instrument to the user's satisfaction.

In some embodiments, the teachings are directed to an audiovisual system for learning a performance. The system can comprise, for example, a processor; an input device operable to receive audio and video data on a non-transitory computer readable storage medium; and, a database operable to store audiovisual files for access on a non-transitory computer readable storage medium. The system can also include an audio engine embodied in a non-transitory computer readable storage medium, wherein the audio engine is operable to transform input audio data to output audio data. Likewise, the system can also include a video engine embodied in a non-transitory computer readable storage medium, wherein the video engine is operable to transform input video data to output video data. Moreover, the system can include a dynamic point reference module embodied in a non-transitory computer readable storage medium, wherein the dynamic point reference module is operable to create a dynamic point reference for a performance using a tempo map, the performance having an audiovisual file with the audio data and the video data. The system can also have an output module embodied in a non-transitory computer readable medium, wherein the output module is operable to (i) transmit the audio data and the video data to an output device in the form of an accurate and precise selection of a desired portion of the performance and (ii) transmit a point-cycling of the desired portion of the performance to a user. The output device is operable to provide the audio data and the video data to the user, assisting the user in learning a performance.

In some embodiments, the system can include a transformation module embodied in a non-transitory computer readable storage medium, wherein the audio portion comprises a multi-track audio file having an isolated instrument audio track and a residual component track, and the transformation module is operable to transform the audio portion into a ratio of (i) the isolated instrument audio track to (ii) the residual component track. In these embodiments, the residual component track can represent a subtraction of the isolated instrument audio track from the multi-track audio file, and the transforming can result from a user selecting a gain ratio of volumes between the isolated instrument audio track and the residual component track. These embodiments can also include an emulation recording module embodied in a non-transitory computer readable storage medium, wherein the emulation recording module is operable to record an emulated audio track. These embodiments can also include an integration engine embodied in a non-transitory computer readable storage medium, wherein the integration engine is operable to combine the emulated instrument audio track with the residual component track to compare the emulated audio track to the isolated instrument audio track.

In some embodiments, the input device can include a microphone, and a camera, and the output device can include a speaker and a graphical user interface. In some embodiments, the output module transmits music transcription and tablature data to a graphical user interface, the music transcription and tablature data reflecting variable tempos from the multi-track audio file. In some embodiments, the output module has a recalibration function operable to recalibrate an audio data track output to adjust tempo in the output of the audio track data. In some embodiments, the output module has a synchronization function operable to synchronize the music transcription and tablature data display on the graphical user interface with the isolated instrument audio track provided to the listener through the speaker. It should be appreciated that the input and output can be an analog or digital audio or video.

In some embodiments, the multi-track audio file further comprises an audible dynamic point reference track, and the transformation module is operable to transform the multi-track audio file into a gain ratio of (i) the isolated instrument audio track, (ii) the residual component, and (iii) the audible dynamic point reference track. In some embodiments, the system further comprises a data exchange module embodied in a non-transitory computer readable medium, the data exchange module operable to exchange data with external computer readable media.

In some embodiments, the system is operable using a hand-held device. And, in some embodiments, the system is operable to function as a particular machine or apparatus having the additional function of telecommunications, word processing, or gaming. Moreover, in some embodiments, the system is operable to function as a particular machine or apparatus not having other substantial functions.

In some embodiments, the system consists of a handheld apparatus. And, the handheld apparatus can have no other substantial functions. In some embodiments, the handheld apparatus is a smart phone, or a handheld computing device having other substantial functions. In some embodiments, the system consists of a game console apparatus.

DETAILED DESCRIPTION OF THE INVENTION

Figure 1:
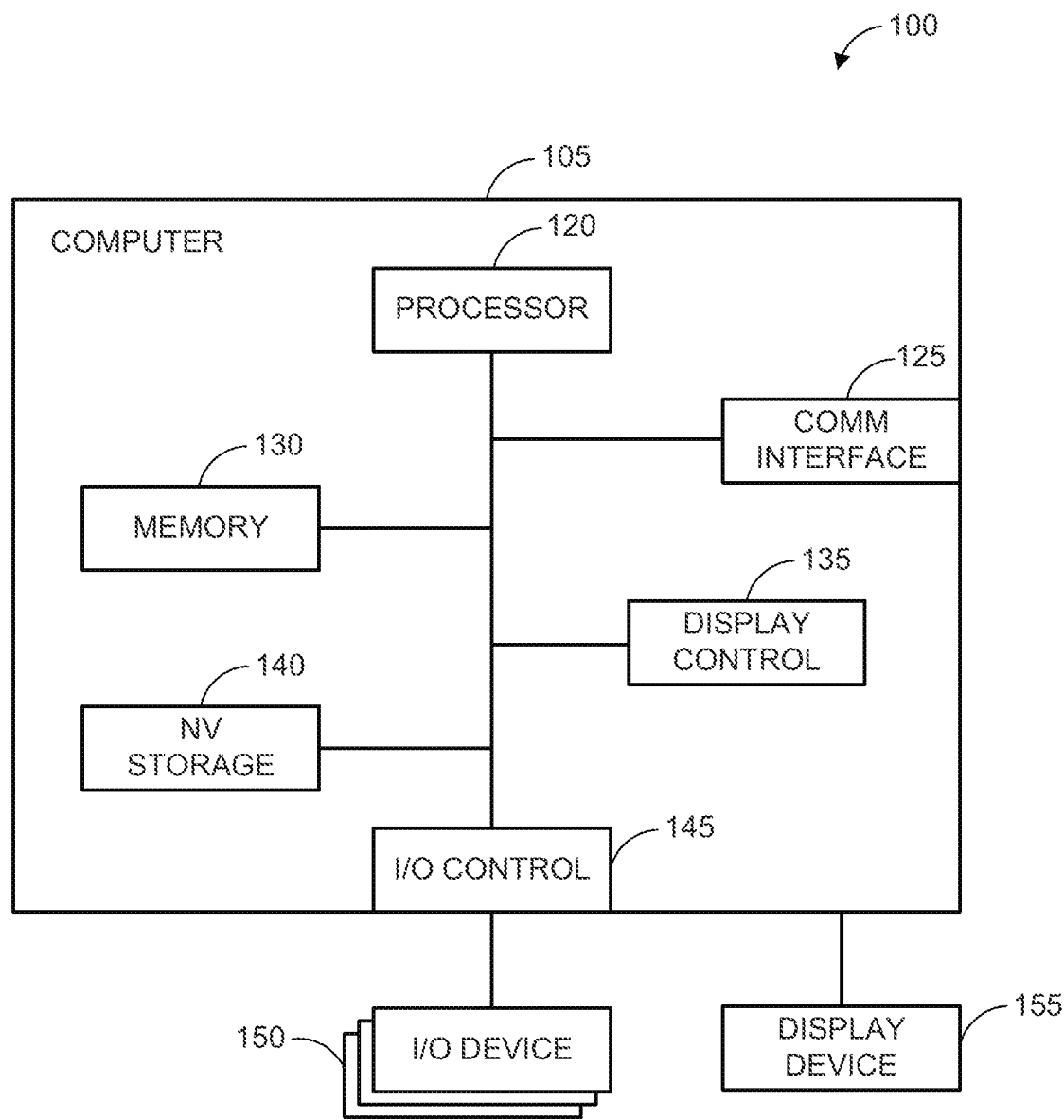
FIG. 1 shows a general technology platform for the system, according to some embodiments.

The systems and methods taught herein are generally directed to a dynamic point referencing of an audiovisual performance for an accurate and precise selection and controlled cycling of portions of the performance. The dynamic point referencing can be used by a learning artist, for example, in analyzing or performing a portion of the work through an accurate and precise digital audio/video instructional method having the controlled cycling feature. Such systems and methods will be appreciated, for example, by musicians, dancers, and other enthusiasts of the performing arts.

In some embodiments, the work comprises an audio portion and a video portion, wherein the video portion includes a performance of the work by a performing artist. In these embodiments, a dynamic point reference can be included within the musical work for an accurate and precise selection and point-cycling of a desired portion of the work. The dynamic point reference can include a tempo map of the musical work that is adaptable for a plurality of tempos within the musical work. An example of tempo mapping can be found, for example, in U.S. Pat. No. 7,902,446, which is hereby incorporated herein in its entirety by reference. The terms "artist," "performing artist," "performer," "instructional artist," "instructor," "teacher," and the like, can be used interchangeably in some embodiments.

In some embodiments, the teachings are directed to a method for a user to learn a performance through an accurate and precise audiovisual instructional process. In these embodiments, the method can include obtaining an audiovisual work having an audio portion, a video portion, and a dynamic point reference for selecting a desired portion of the audiovisual work. The method can also include selecting the desired portion of the work using the dynamic point reference and emulating the performance. The method can also include point-cycling the desired portion until the desired portion is learned to a satisfaction of the user. The term "user" can include any operator of the system which, in some embodiments, can include a "learning artist," "student," "observer," "analyst," "voter," "judge," "teacher", "instructor," "competitor", "competing artist", "competing performer," and the like.

In some embodiments, the teachings herein can include the development of a tempo map, and the tempo map can comprise a mapping of a complex tempo. In some embodiments, for example, the teachings are directed to a method of creating the instructional work of a performing art. Such methods can include selecting the work; and, mapping the audio portion of the work to create a dynamic point reference. The dynamic point reference is used to facilitate an accurate and precise selection, and point-cycling, of a desired portion of the work. In some embodiments, the dynamic point reference includes a tempo map of the audio portion that is adaptable for a plurality of tempos within the work. The term "dynamic point reference" can also be referred to as a "map," "a tempo map," "a customized tempo map," "a timing reference," "a variable timing reference," "a manually created and audible, variable timing reference," "an index," "indexing," "a custom index," "a customized indexing," "grid," "tempo/index," "position point reference," "variable point reference," or the like, in some embodiments.

The terms "audio/video," "audiovisual," "audio/visual," "AV," and the like, can be used interchangeably in most embodiments, the terms typically being used to refer to a work having an audio track or audio portion and a corresponding video portion or video portion. The term "corresponding" can refer, for example, to (i) the original source file recorded with the video; or, (ii) a recreated file in which the audio and/or video has been recreated or added, making the audio/video file useful for the teachings provided herein. Audiovideo files can include, for example, a monotrack audio file, a stereo audio file, or a multi-track audio file. A "multitrack file" can include, for example, from about 3 tracks to over 200 tracks, in some embodiments. And, it should be appreciated that a multi-track audio file can be analog or digital and, in fact, it can be extracted from a mono- or stereo-mixed file, or it can be extracted from any type of audio file sharing multiple instruments. The term "extracted" can be used to refer to a separation of instruments, in some embodiments, that are combined in an audio file. One of skill will readily identify such extraction methods known in the art including, but not limited to, processes that use phase- or phase-reversal techniques or frequency techniques (e.g., fast-fourier transform, FFT, discrete fourier transform, DFT, etc), mathematical algorithms, or a combination thereof, for example. Such extractions can be used with the teachings herein, in some embodiments.

An advantage of the teachings provided herein is the accuracy and precision available in the selection of a desired portion. Due to this advantage, the cycling can include any selected time-frame within the work, such as a period of silence in an audio track, or any one or any series of sounds, beats, and bars. In some embodiments, the cycling can consist of a single musical note, a single repeating rhythmic pattern, or a series of accurate and precise selections from a tempo map. Each selection in the series of selections can consist of silence, a musical note, a plurality of beats, a bar, a plurality of bars, a repeating rhythmic pattern, or any combination thereof. In some embodiments, a visual portion of the work can provide a point of reference for the cycling such as, for example, during a period of silence in the work, or where an audio portion of the work is otherwise insufficient to establish a point of reference for the cycling, such as where the audio portion is damaged or ineffective. The ability to accurately and precisely select and cycle a desired portion of a musical work is a valuable aspect of the teachings provided herein. The terms "cycling," "point cycling," "rhythmic cycling," "looping," and "controlled cycling," can refer to the repeated playback of a desired portion selected using the teachings provided herein.

The terms "accurate," "accurately," and the like, can be used to refer to a measurable error, or in some embodiments the absence of a measurable error, in the difference between a user's actual desired portion, and the user's ability to select the desired portion from a work using the teachings provided herein. And, the desired portion can be a portion of an audio track or a related video portion. The terms "precise," "precisely," "precision," and the like can be used to refer the user's ability to reproducibly select the desired portion. The high degree of accuracy provided through the systems and methods taught herein produces, in response, likewise results in a high degree of precision for the user as well.

In some embodiments, the systems methods provided herein results in substantially no error in the selecting of the desired portion, such that any error may be isolated to fall within a relatively high accuracy of a computing system performing the functions taught herein which, in some embodiments, any error in selecting the desired portion can be less than a fraction of a millisecond. Such a computing system error may be, for example, less than about 3 milliseconds in some embodiments, between about 0.5 milliseconds and about 3 milliseconds in other embodiments, and less than perhaps a single millisecond in yet other embodiments. The term "desired portion" can be used to refer to a portion of a musical work that may range in duration, for example, from about 50 milliseconds to about 20 minutes. In some embodiments, a user can try to select a desired portion having a time duration of play that is very short, for example, ranging from about 90 ms to perhaps about 0.5 seconds or 1 second, making it difficult for the user to select the desired portion in a real-time manner. In this instance, such user error resulting from user response time is mitigated by offering the various features taught herein that include, for example, (i) a "nudge" function that allows the user to move forward in a preselected number of beats or any time reference, such as a single beat, fraction of a beat, pairs of beats, sets of beats, bars, pairs of bars, sets of bars, and the like; (ii) rules that automatically provide a region around an area selected, such that the user can be too slow or too fast in response time and still capture the desired portion; and (iii) a tempo adjustment to allow the user to, for example, slow down a whole work, or particular section to facilitate ease of selection of the desired portion.

As such, in any event, the accuracy provided by the teachings provided herein are extraordinarily high despite the presence of any potential user error, as well as near perfect to perfect (within the bounds of any computing system error) in the absence of such user error. One of skill will appreciate that the high degree of accuracy results in a high degree of precision that can be realized using the systems and methods taught herein. Moreover, since the cycling feature is based on the same system structure, the cycling feature is likewise highly accurate and precise. This high level of accuracy and precision allows for an accurate and precise selection and cycling of a desired of portion of a video portion in an audio/video work. Accordingly, one of skill will appreciate that the systems and methods provided herein offer a highly accurate, highly precise, and high resolution systems and methods that can be used in a variety of applications, for example, to analyze and study a performance in an audiovisual work.

FIG. 1 shows a general technology platform for the system, according to some embodiments. The computer system 100 may be a conventional computer system and includes a computer 105, I/O devices 150, and a display device 155. The computer 105 can include a processor 120, a communications interface 125, memory 130, display controller 135, non-volatile storage 140, and I/O controller 145. The computer system 100 may be coupled to or include the I/O devices 150 and display device 155.

The computer 105 interfaces to external systems through the communications interface 125, which may include a modem or network interface. It will be appreciated that the communications interface 125 can be considered to be part of the computer system 100 or a part of the computer 105. The communications interface 125 can be an analog modem, isdn modem, cable modem, token ring interface, satellite transmission interface (e.g. "direct PC"), or other interfaces for coupling the computer system 100 to other computer systems. In a cellular telephone, this interface is typically a radio interface for communication with a cellular network and may also include some form of cabled interface for use with an immediately available personal computer. In a two-way pager, the communications interface 125 is typically a radio interface for communication with a data transmission network but may similarly include a cabled or cradled interface as well. In a personal digital assistant, the communications interface 125 typically includes a cradled or cabled interface and may also include some form of radio interface, such as a BLUETOOTH or 802.11 interface, or a cellular radio interface, for example.

The processor 120 may be, for example, any suitable processor, such as a conventional microprocessor including, but not limited to, an Intel Pentium microprocessor or Motorola power PC microprocessor, a Texas Instruments digital signal processor, or a combination of such components. The memory 130 is coupled to the processor 120 by a bus. The memory 130 can be dynamic random access memory (DRAM) and can also include static ram (SRAM). The bus couples the processor 120 to the memory 130, also to the non-volatile storage 140, to the display controller 135, and to the I/O controller 145.

The I/O devices 150 can include a keyboard, disk drives, printers, a scanner, and other input and output devices, including a mouse or other pointing device. The display controller 135 may control in the conventional manner a display on the display device 155, which can be, for example, a cathode ray tube (CRT) or liquid crystal display (LCD). The display controller 135 and the I/O controller 145 can be implemented with conventional well known technology, meaning that they may be integrated together, for example.

The non-volatile storage 140 is often a FLASH memory or read-only memory, or some combination of the two. A magnetic hard disk, an optical disk, or another form of storage for large amounts of data may also be used in some embodiments, although the form factors for such devices typically preclude installation as a permanent component in some devices. Rather, a mass storage device on another computer is typically used in conjunction with the more limited storage of some devices. Some of this data is often written, by a direct memory access process, into memory 130 during execution of software in the computer 105. One of skill in the art will immediately recognize that the terms "machine-readable medium" or "computer-readable medium" includes any type of storage device that is accessible by the processor 120 and also encompasses a carrier wave that encodes a data signal. Objects, methods, inline caches, cache states and other object-oriented components may be stored in the non-volatile storage 140, or written into memory 130 during execution of, for example, an object-oriented software program.

The computer system 100 is one example of many possible different architectures. For example, personal computers based on an Intel microprocessor often have multiple buses, one of which can be an I/O bus for the peripherals and one that directly connects the processor 120 and the memory 130 (often referred to as a memory bus). The buses are connected together through bridge components that perform any necessary translation due to differing bus protocols.

In addition, the computer system 100 can be controlled by operating system software which includes a file management system, such as a disk operating system, which is part of the operating system software. One example of an operating system software with its associated file management system software is the family of operating systems known as Windows CEO and Windows® from Microsoft Corporation of Redmond, Washington, and their associated file management systems. Another example of operating system software with its associated file management system software is the LINUX operating system and its associated file management system. Another example of an operating system software with its associated file management system software is the PALM operating system and its associated file management system. Another example of an operating system is an ANDROID, or perhaps an iOS, operating system. The file management system is typically stored in the non-volatile storage 140 and causes the processor 120 to execute the various acts required by the operating system to input and output data and to store data in memory, including storing files on the non-volatile storage 140. Other operating systems may be provided by makers of devices, and those operating systems typically will have device-specific features which are not part of similar operating systems on similar devices. Similarly, WinCEO, PALM, IOS or ANDROID operating systems, for example, may be adapted to specific devices for specific device capabilities.

The computer system 100 may be integrated onto a single chip or set of chips in some embodiments, and can be fitted into a small form factor for use as a personal device. Thus, it is not uncommon for a processor, bus, onboard memory, and display/I-O controllers to all be integrated onto a single chip. Alternatively, functions may be split into several chips with point-to-point interconnection, causing the bus to be logically apparent but not physically obvious from inspection of either the actual device or related schematics.

Figure 2A:
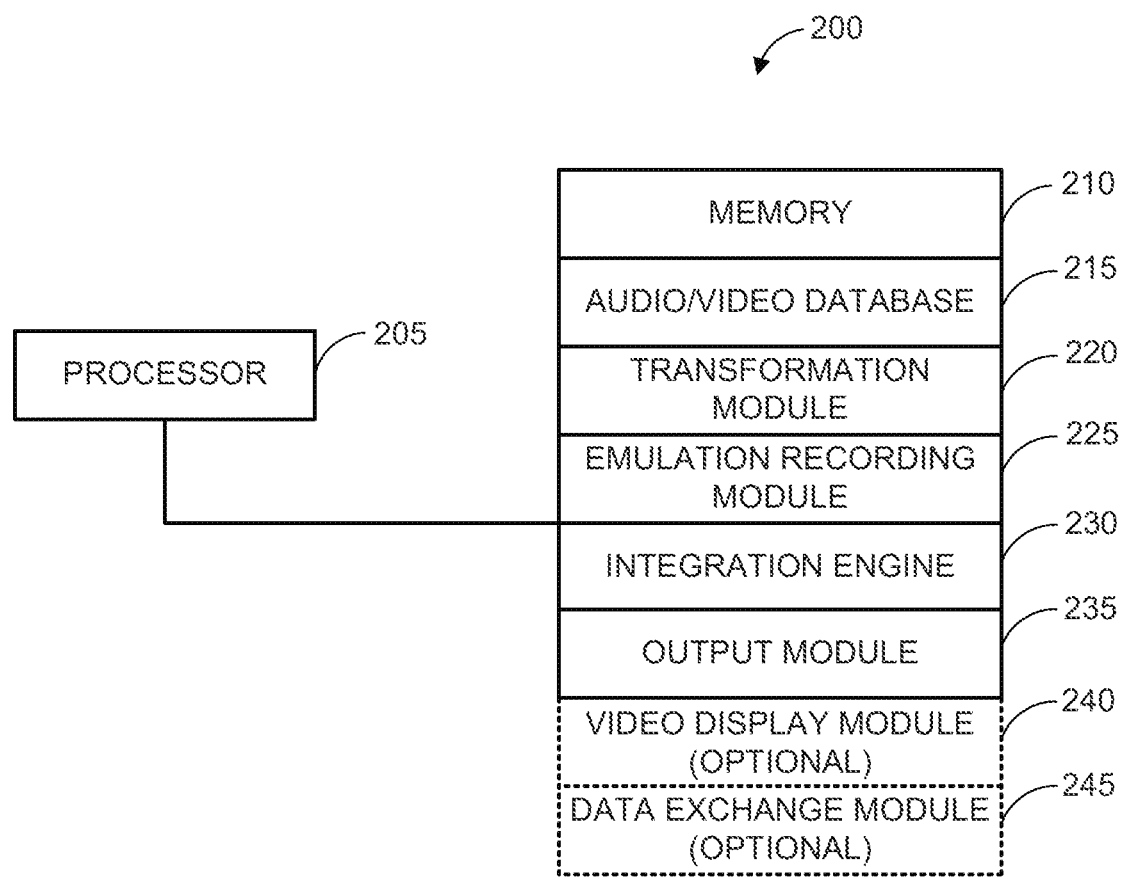
FIGS. 2A and 2B illustrate a processor-memory diagram to describe components of the system, according to some embodiments.
Figure 2B:
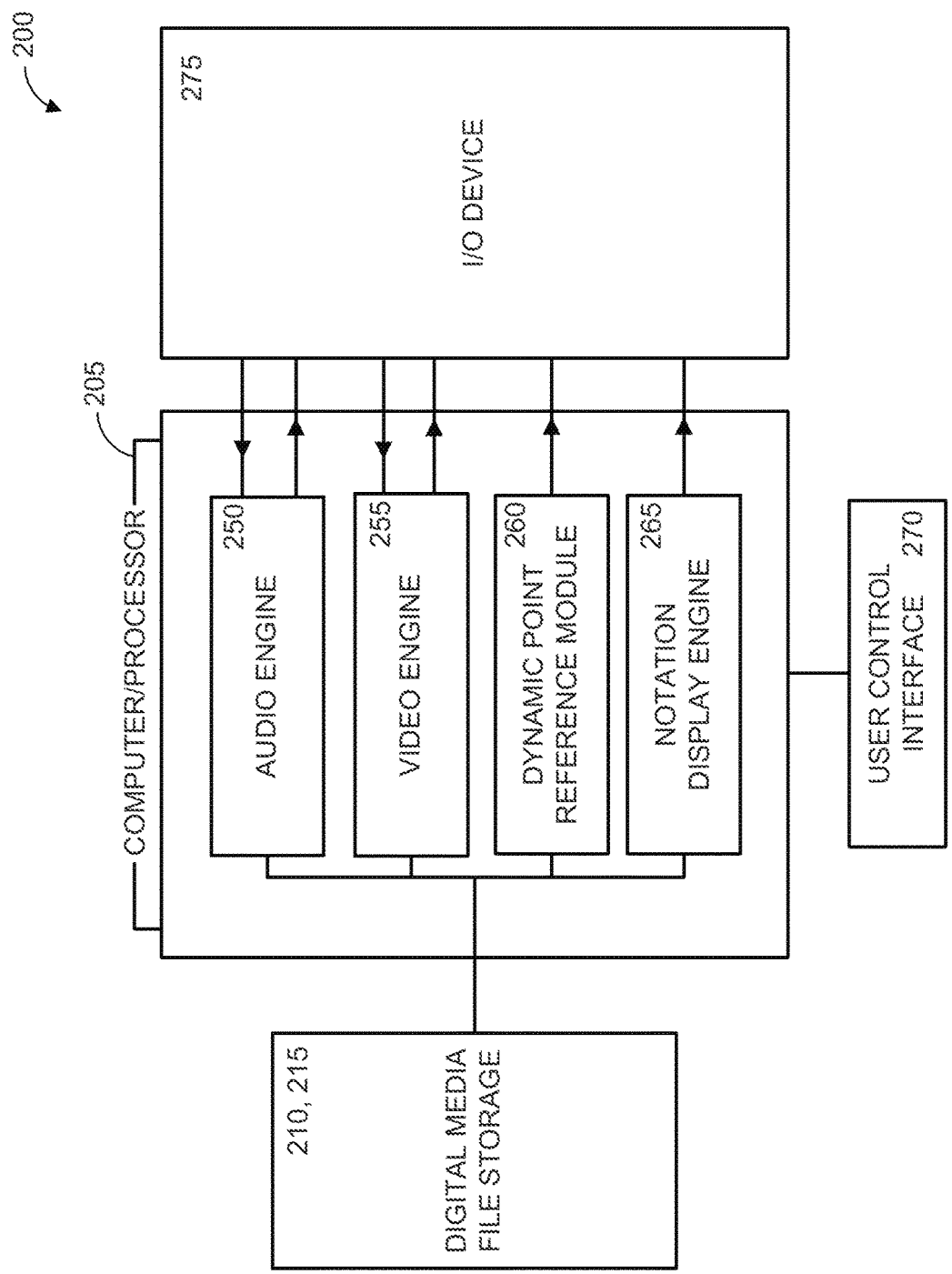

FIGS. 2A and 2B illustrate processor-memory diagrams to describe components of the system, according to some embodiments. In FIG. 2A, the system 200 shown in FIG. 2 contains a processor 205 and a memory 210 (that can include non-volatile memory), wherein the memory 210 includes an audio/video database 215, a transformation module 220, an emulation recording module 225, an integration engine 230, an output module 235, and an optional video display module 240, which can also be a part of the output module 235. The system can further comprise an optional data exchange module 245 embodied in a non-transitory computer readable medium, wherein the data exchange module is operable to exchange data with external computer readable media.

The system includes an input device (not shown) operable to receive audio data or video data on a non-transitory computer readable medium. Examples of input devices include a data exchange module operable to interact with external data formats, voice-recognition software, a hand-held device in communication with the system including, but not limited to, a microphone, and the like, as well as a camera or other video image capture and transmission device. It should be appreciated that the input and output can be an analog or digital audio or video, The audio/video database 215 is operable to store audio or video files for access on a non-transitory computer readable storage medium. In some embodiments, the system can store original multi-track audio files, copies of original multi-track audio files, and the like. Any audio or video file known to one of skill in the art can be stored including, but not limited to sound files, text files, image files, and the like. In some embodiments, the system can access any of a variety of accessible data through a data exchange module, as discussed above.

Any audio or video format known to one of skill in the art can be used. In some embodiments, the audio file comprises a format that supports one audio codec and, in some embodiments, the audio file comprises a format that supports multiple codecs. In some embodiments the audio file comprises an uncompressed audio format such as, for example, WAV, AIFF, and AU. In some embodiments, the audio file format comprises lossless compression such as, FLAC, Monkey's Audio having file extension APE, WavPack having file extension WV, Shorten, Tom's lossless Audio Kompressor (TAK), TTA, ATRAC Advanced Lossless, Apple Lossless, and lossless WINDOWS Media Audio (WMA). In some embodiments, the audio file format comprises lossy compression, such as MP3, Vorbis, Musepack, ATRAC, lossy WINDOWS Media Audio (WMA) and AAC.

In some embodiments, the audio format is an uncompressed PCM audio format, as a ".wav" for a WINDOWS computer readable media, or as a ".aiff" as a MAC OS computer readable media. In some embodiments a Broadcast Wave Format (BWF) can be used, allowing metadata to be stored in the file. In some embodiments, the audio format is a lossless audio format, such as FLAC, WayPack, Monkey's Audio, ALAC/Apple Lossless. In some embodiments, the lossless audio format provides a compression ratio of about 2:1. In some embodiments, the audio format is a free-and-open format, such as way, ogg, mpc, flac, aiff, raw, au, or mid, for example. In some embodiments, the audio format is an open file format, such as gsm, dct, vox, aac, mp4/m4a, or mmf. In some embodiments the audio format is a proprietary format, such as mp3, wma, atrac, ra, ram, dss, msv, dvg, IVS, m4p, iklax, mxp4, and the like.

The transformation module 220 is operable to transform a multi-track audio file comprising an isolated instrument audio track and a residual component track into a ratio of (i) the isolated instrument audio track to (ii) the residual component track, wherein the residual component track represents a subtraction of the isolated instrument audio track from the plurality of audio tracks, and the transforming can results from a user selecting a gain ratio, for example, between the isolated instrument audio track, the residual component track, and a click track. It should be appreciated that a "gain ratio" can be used to refer to a user-controlled variable sound level relationship between the minimum (inaudible) sound volume (infinity: 1) to maximum loudness output (0 dB full scale with a ratio of 1:1). The terms "gain" and "volume" can be used interchangeably in some embodiments, where a gain of "0" can be used, in some embodiments, as a reference for a minimum volume of an audio portion, track or otherwise; and, a ratio of 0 can be used to refer to a gain in the numerator of 0. For example, a ratio of an isolated instrument audio track to a residual component audio track of 0 can mean, for example, that at least the isolated instrument audio track has been turned off, or at least down to the minimum volume setting of 0. This setting allows the residual component volume, or gain, to be adjusted to an audible level desired by a user. Likewise, a ratio of a residual component audio track to an isolated instrument audio track of 0, for example, can mean that the residual component audio track has been turned off, or at least down to the minimum volume setting of 0, such that the isolated instrument audio track can be adjusted to a desired audible level for play in the absence of the residual component audio track.

The "residual component track" can be referred to as "a background audio track" or "an emulation audio track," in some embodiments. The term "metronome track" can be referred to as a "click track," "manually created, audible, variable timing reference track," "audible, variable timing reference track," "variable timing reference track," "audible, dynamic point reference track," "audible, position point reference track," "audible, variable point reference track," and the like, in some embodiments. It should be appreciated that, in some embodiments, the metronome track can provide a steady tempo. However, the term "metronome track" can also be used to refer to a track having a variable tempo for use with the dynamic point referencing taught herein.

The residual track represents a subtraction of the isolated instrument audio track from the plurality of audio tracks, and the transforming can result from a user selecting a between the isolated instrument audio track, the residual track, and the click track. The system can also include an emulation recording module 225 embodied in a non-transitory computer readable medium. The emulation recording module 225 is operable to record the user's emulated audio track on a non-transitory computer readable medium. In some embodiments, the emulation recording module 225 can be operable within a single functioning section of a system, such as a single page of a software application. In some embodiments, the emulation recording module 225 can be operable within a plurality of functioning sections of a system, such as in a plurality of pages of a software application, such that the recording can occur quickly at the choosing of the user without having to move from one section of the system to another section of the system.

The system can also include an integration engine 230 embodied in a non-transitory computer readable medium, wherein the integration engine 230 is operable to combine the emulated instrument audio track with the residual track to transform the multi-track audio file into an educational audio file. In addition, the system can include an output module 235 embodied in a non-transitory computer readable medium, wherein the output module 235 is operable to transmit audio data to an output device, which can be a graphical user interface, or video display, which can optionally be supported by a separate video display module 240, or the display can be supported with one or more other output devices by the output module 235. The output device can be operable to provide audio data to the user, wherein the audio data assists the user in learning a preselected piece of music.

In some embodiments, the input device comprises a microphone and/or camera and, in some embodiments, the output module 235 transmits music transcription and tablature data, or an alternative visual representation that may or may not be traditional transcription and tablature data, such as an animated motion graphic or cartoon, of an instrument or performance, to a graphical user interface. In some embodiments, the output device comprises a speaker, a graphical user interface, or both a speaker and a graphical user interface, for example. And, in some embodiments, the output module has a synchronization function operable to synchronize the music transcription and tablature data display on the graphical user interface with the isolated instrument audio track provided to the listener through the speaker.

The output module 235 can also have a recalibration function operable to recalibrate an audio data track output to correct a latency in the output of the audio track data. One of skill will appreciate that time stamps can be used to align, recalibrate, and correct latencies in the output of a data stream flow. In some embodiments, the latency is corrected by time stamping samples of the audio data, where a "sample" is a short wave form of the audio having a length measured by an increment of time. In some embodiments, a sample is less than a second long, (e.g., about $\frac{1}{100}$ of a second, or $\frac{1}{1000}$ of a second, in duration). In some embodiments, the samples can be about 44/1000 of a second long. An audio track can contain, for example, about 44,000 samples per track per second in a high quality sound file. As such, the concept of a sample and sample resolution is a measure of audio resolution or quality. A lower quality mono audio file can have about 22,000 samples per track per second, for example.

Recalibration techniques can be used in some embodiments. Bandwidth limitations of a computer system, for example, can create variations or transients in misalignments between tracks and hinder sound quality. A computer having a smaller CPU than another computer having a larger CPU but similar memory capacity can have latency problems that result in performance problems. In some embodiments, the system can provide an output of 4 streaming files, and these files can include (i) a residual component track that does not contain the isolated instrument audio track, (ii) an isolated instrument audio track, (iii) an emulated instrument audio track, and (iv) a dynamic point reference that can provide a dynamic point referencing of a variable tempo. In some embodiments, the residual component track, the isolated instrument audio track, and the emulated instrument audio track are stereo files and, in some embodiments, the index track is a mono file. Each track in each file has it's own timeline, and there can be acceptable variances that are not noticeable to the ear, but there can also be unacceptable variances that result in an unacceptable and audible degradation in audio quality.

Each input file is comprised of an array of samples, and each sample can be used as a marker in time, since each sample position has an actual position that will serve as a measure of variance against an ideal position. The recalibration is performed on sets of samples. When a group of samples is off in time, the system can be designed to correct for the next set of samples. For example, a system can be designed to recalibrate based on a sample resolution that provides a 0.001 second accuracy by measuring the variance of a time stamp on a group of 44 samples (0.001 of a second for a 44,000 sample/sec high quality sample) to an ideal time stamp for that sample set. A fast method of recalibration was developed to reduce this variance or "latency" in the audio so that it's not detectable to human being. A good ear, for example, can hear time variance between tracks of about 1/60 of a second, and multiple events of variances in a closely related string of samples can be cumulative, making it necessary to have a variance at least an order of magnitude under 1/60 of a second. In some embodiments, the minimum audio resolution in a sample for latency correction should be no less than 300 samples in a segment. In some embodiments, the audio resolution in a sample for latency correction is about 44 samples in a segment. In some embodiments, it was found that the recalibration should be done on each "run through" of the data in the system, where a "run through" is an emptying and a filling of a data queue in the system. Between data loads in a queue, the recalibration occurs by measuring the difference between the actual time of each track and the ideal time of each track and a correction is applied between data loads. In some embodiments, the audio queues up several hundred times per second.

The CPU on a handheld computer system can have difficulties concurrently processing the audio data files described herein. In some embodiments, a handheld computing system may have latency difficulties when concurrently processing more than 2 audio data files. As such, data files may require compression. In some embodiments, the data files can be compressed using a compression technique, for example, such as QUICKTIME by Apple. Other file compression techniques can be used. IMA4 can also be used to compress the files in some embodiments. In some embodiments, the system requires at least a 600-700 MHz processor. The iPhone has a 400 MHz processor, on the other hand, suggesting that compressed audio data files may be needed for use of some embodiments of the system on the iPhone. The IMA4 compression method compresses the audio data file to about 25% of file size. An iPAD system can also be used in some embodiments.

In some embodiments, it should be appreciated, however, that the system can use pure, uncompressed wave files. Many home PCs, however, may not need compressed files due to the more powerful processors currently available for home PCs. The bandwidth of the computer system, i.e. the size of the CPU and memory will dictate whether compression is necessary. One of skill in the art will appreciate that certain compression technologies may be needed in some systems for optimum performance and that these technologies are readily identifiable and accessible.

One of skill will appreciate that time stamping of data samples can also be used to synchronize between other data streams. In some embodiments, an additional audio data stream is used to provide a digital musical transcription and tablature display in the form of a graphical display. This audio data can be synchronized and recalibrated at the same time as the other audio data.

An audio file, such as a multi-track audio file, can further comprise an index track. As such, in some embodiments, the transformation module 220 can be operable to transform a multi-track audio file into a ratio of (i) the isolated instrument audio track, (ii) the residual track, and (iii) the index track, and a between the isolated instrument audio track, the residual track, and the index track can be selected by the user.

As described above, the system can further comprise an optional data exchange module 245 embodied in a non-transitory computer readable medium, wherein the data exchange module is operable to exchange data with external computer readable media. The data exchange module can, for example, serve as a messaging module operable to allow users to communicate with other users having like subject-profiles, or others users in a profile independent manner, merely upon election of the user. The users can email one another, post blogs, or have instant messaging capability for real-time communications. In some embodiments, the users have video and audio capability in the communications, wherein the system implements data streaming methods known to those of skill in the art. In some embodiments, the system is contained in a hand-held device; operable to function as a particular machine or apparatus having the additional function of telecommunications, word processing, or gaming; or operable to function as a particular machine or apparatus not having other substantial functions.

In FIG. 2B, a flowchart shows a variation of the system 200 where processor 205 is in operable connection with the memory 210 and the audio/video database are in digital media file storage 210,215. The system 200 can also include an audio engine 250 embodied in a non-transitory computer readable storage medium, wherein the audio engine 250 is operable to transform input audio data to output audio data. Likewise, the system 200 can also include a video engine 255 embodied in a non-transitory computer readable storage medium, wherein the video engine 255 is operable to transform input video data to output video data. Moreover, the system 200 can include a dynamic point reference module 260 embodied in a non-transitory computer readable storage medium, wherein the dynamic point reference module 260 is operable to create a dynamic point reference for a performance using a tempo map, the performance having an audiovisual file with the audio data and the video data. The system 200 can also have an output module (not shown) embodied in a non-transitory computer readable medium, wherein the output module is operable to (i) transmit the audio data and the video data to an output device in the form of an accurate and precise selection of a desired portion of the performance and (ii) transmit a point-cycling of the desired portion of the performance to a user. The output device 275 is operable to provide the audio data and the video data to the user, assisting the user in learning a performance. The system 200 can also include a notation display engine 265 to display music transcription and tablature indexed to the dynamic point reference. Moreover, the system 200 can include a user control interface 270.

The systems taught herein can be practiced with a variety of system configurations, including personal computers, multiprocessor systems, microprocessor-based or programmable consumer electronics, network PCs, minicomputers, mainframe computers, and the like. The teachings provided herein can also be practiced in distributed computing environments where tasks are performed by remote processing devices that are linked through a communications network. As such, in some embodiments, the system further comprises an external computer connection through the data exchange module 245 and a browser program module (not shown). The browser program module (not shown) can be operable to access external data as a part of the data exchange module 245.

Figure 3:
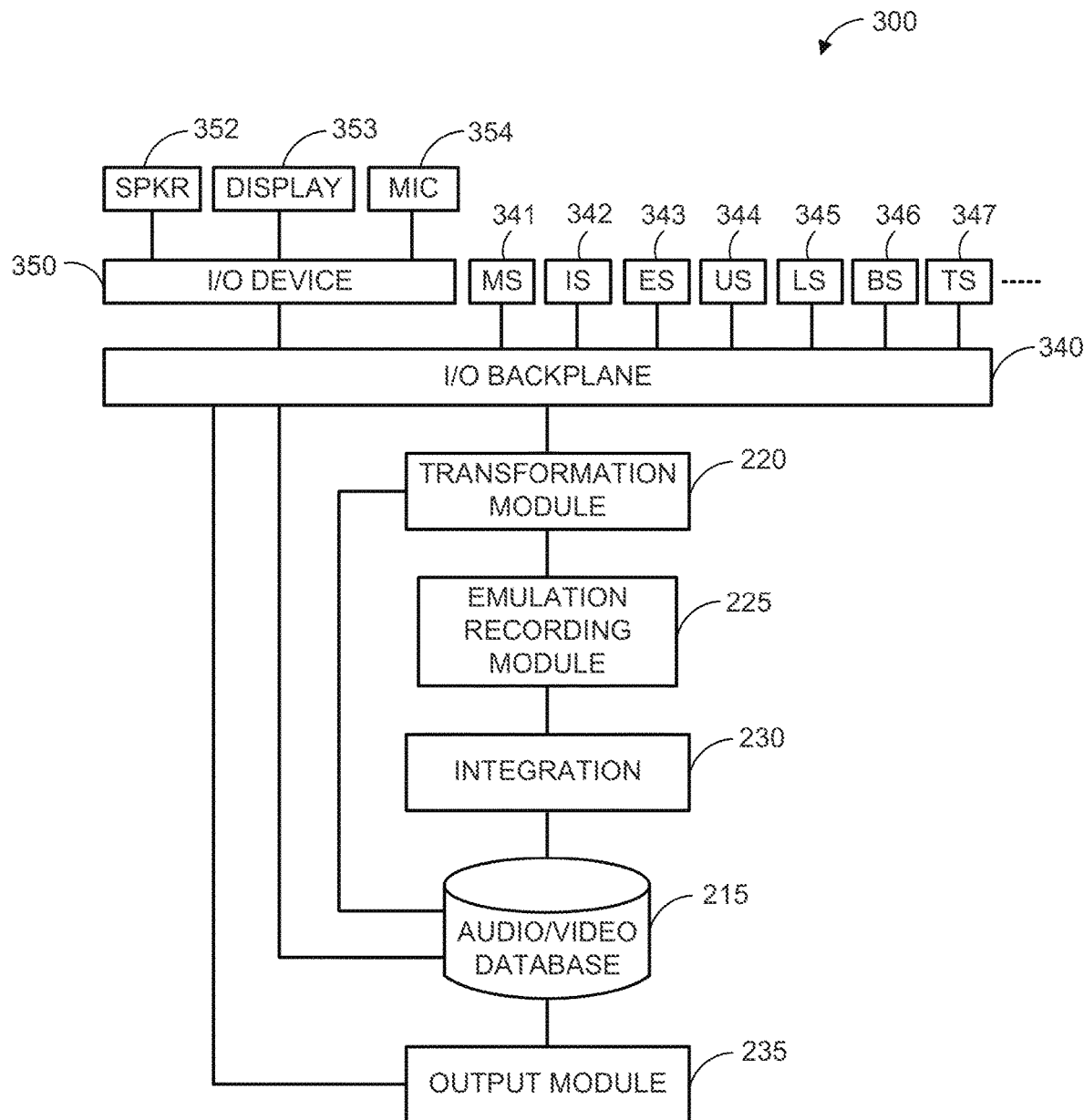
FIG. 3 is a concept diagram illustrating the system, according to some embodiments.

FIG. 3 is a concept diagram illustrating the system, according to some embodiments. The system 300 contains components that can be used in a typical embodiment. In addition to the audio database 215, the transformation module 220, the emulation recording module 225, the integration engine 230, and the output module 235 shown in FIG. 2, the memory 210 of the device 300 also includes a data exchange module 245 and the browser program module (not shown) for accessing the external data. The system includes a speaker 352, display 353, and a printer 354 connected directly or through I/O device 350, which is connected to I/O backplane 340.

The system 300 can be implemented in a stand-alone device, rather than a computer system or network. In FIG. 3, for example, the I/O device 350 connects to the speaker (spkr) 352, display 353, and microphone (mic) 354, but could also be coupled to other features. Such a device can have a music state selector 341, an isolated instrument audio track state selector 342, a residual track state selector 343, a user's emulated audio track state selector 344, a learning state selector 345 for the educational audio track, a bar state selector 346, and a timer state selector 347 for the index track, with each state selector connected directly to the I/O backplane 340.

In some embodiments, the system further comprises security measures to protect the subject's privacy, integrity of data, or both. Such security measures are those well-known in the art such as firewalls, software, and the like. In addition, the system can be configured for use in an environment that requires administrative procedures and control. For example, the system can include an administrative module (not shown) operable to control access, configure the engines, monitor results, perform quality assurance tests, and define audiences for targeting and trending. Since the system can safely be provided by a network and, in some embodiments, the system is coupled to a network, the security measures can help protect the contents of the system from external intrusions.

In some embodiments, the system is a web enabled application and can use, for example, Hypertext Transfer Protocol (HTTP) and Hypertext Transfer Protocol over Secure Socket Layer (HTTPS). These protocols provide a rich experience for the end user by utilizing web 2.0 technologies, such as AJAX, Macromedia Flash, etc. In some embodiments, the system is compatible with Internet Browsers, such as Internet Explorer, Mozilla Firefox, Opera, Safari, etc. In some embodiments, the system is compatible with mobile devices having full HTTP/HTTPS support, such as iPhone, PocketPCs, Microsoft Surface, Video Gaming Consoles, and the like. In some embodiments, the system can be accessed using a Wireless Application Protocol (WAP). This protocol will serve the non HTTP enabled mobile devices, such as Cell Phones, BlackBerries, Droids, etc., and provides a simple interface. Due to protocol limitations, the Flash animations are disabled and replaced with Text/Graphic menus. In some embodiments, the system can be accessed using a Simple Object Access Protocol (SOAP) and Extensible Markup Language (XML). By exposing the data via SOAP and XML, the system provides flexibility for third party and customized applications to query and interact with the system's core databases. For example, custom applications could be developed to run natively on iPhones, Java or .Net-enabled platforms, etc. One of skill will appreciate that the system is not limited to any of the platforms discussed above and will be amenable to new platforms as they develop.

In some embodiments, the teachings are directed to a method for a user to learn a performance through an accurate and precise audiovisual instructional process. In these embodiments, the method can include obtaining an audiovisual work having an audio portion, a video portion, and a dynamic point reference for selecting a desired portion of the audiovisual work. The method can also include selecting the desired portion of the work using the dynamic point reference and emulating the performance. The method can also include point-cycling the desired portion until the desired portion is learned to a satisfaction of the user.

Figure 4:
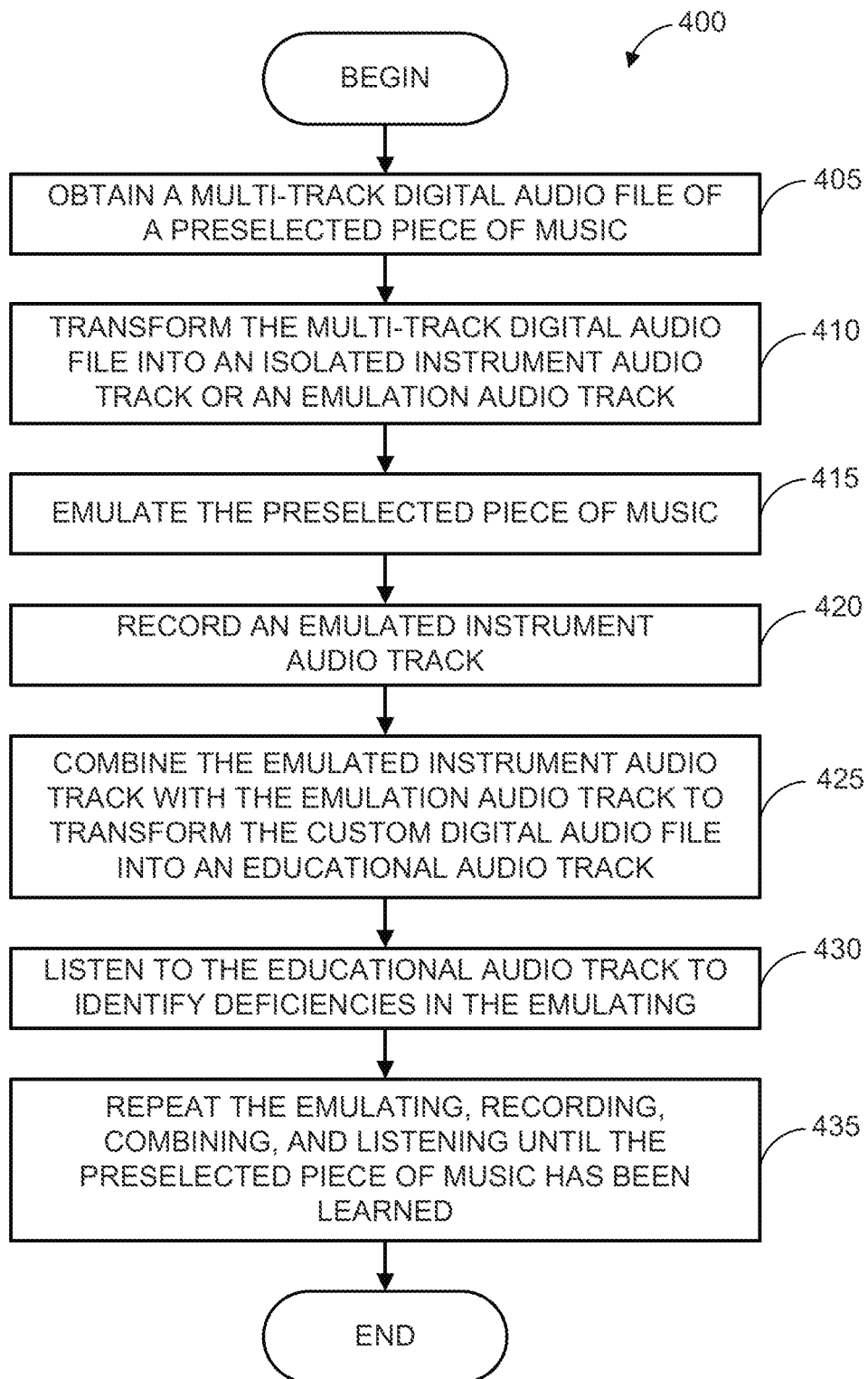
FIG. 4 is a diagram of the logic of the system, according to some embodiments.

FIG. 4 is a diagram of the logic of an audio portion of the system, according to some embodiments. In some embodiments, the teachings are directed to a method of learning music through an educational audiovisual track, such as an instructional musical work. The method includes obtaining 405 a multi-track audio file produced from a multi-track audio recording. The multi-track audio file can be presented with a related video portion according to the teachings provided herein. The multi-track audio file can have an isolated instrument audio track and a residual track, and the isolated instrument audio track can have a single musical instrument playing a preselected piece of music that a user desires to learn on a preselected musical instrument. The method includes transforming 410 the composition of a multi-track audio file to include a ratio of (i) the isolated instrument audio track to (ii) a residual track. The residual component audio track represents a subtraction of the isolated instrument audio track from the plurality of audio tracks. The method includes emulating 415 the preselected piece of music by listening to the isolated instrument audio track, watching the corresponding video portion, and playing the preselected musical instrument to create an emulated instrument audio track. Consistent with the teachings provided herein, the emulating can include the video instructional which can be controlled and indexed through the tempo map as taught herein for use in conjunction with an audio track. The emulated instrument audio track is recorded 420 on a non-transitory computer readable medium and combined 425 with the residual track to transform the custom digital audio file into an educational audio file. The method includes listening 430 to the educational audio track to identify deficiencies in the emulating by the user. The user repeats 435 the emulating, recording, combining, and listening until the user has learned the preselected piece of music on the preselected musical instrument to the user's satisfaction.

In some embodiments, the transforming 410 includes reducing the volume of the residual track and, in some embodiments, the transforming 410 includes reducing the volume of the isolated instrument audio track. In some embodiments, the video portion is controlled through the tempo map as taught herein for a user to better understand how to play, and emulate the subtleties in an audio track. The method can further comprise selecting one or more bars of the isolated instrument audio track to enable the user to focus on emulating a section of the preselected piece of music. In some embodiments, the method can include the selection one or more bars to provide a repeated playback of the section. In some embodiments, the emulating 415 can further comprise reading a digital musical transcription and tablature display corresponding to the isolated instrument audio track. And, in some embodiments, the custom digital audio file further comprises an isolated index track, and the method further comprises listening to the isolated index track that is designed for the preselected piece of music.

The performing artist in an audiovisual work can be amateur or professional. For example, the performing artist can be a popular artist, in some embodiments. Likewise, the musical work can be amateur or professional. For example, the musical work can be a popular musical work, in some embodiments. And, in some embodiments, the musical work can be an original, master multi-track recording of a popular, professional artist or group. As such, the performing artist can even be the popular professional artist or group that performed the original, master multi-track recording.

It should be appreciated that the user can isolate any desired portion of an audio track, and associated video portion, including any one or any series of sounds, beats, and bars. In some embodiments, the desired portion can consist of a single musical note, a single repeating rhythmic pattern, or a series of accurate and precise selections from the tempo map. Each selection in the series of selections can consist of a musical note, a plurality of beats, a bar, a plurality of bars, a repeating rhythmic pattern, or any combination thereof.

As described herein, a video display provides a unique way for the learning artist to more readily learn a piece of music. In some embodiments, the video portion includes a plurality of instructional views of the instructional artist performing the musical work for selection by the learning artist.

The musical work can include any format or compilation that one of skill would find useful as applied to the teachings herein. In some embodiments, the musical work can be a multi-track musical work comprising an isolated audio track consisting of a solo performance that was not obtained through a process of subtracting the solo performance from a mixture of performances. Likewise, in some embodiments, the musical work can be a multi-track musical work comprising a plurality of isolated audio tracks consisting of a plurality of solo performances that were not obtained through a process of subtracting the solo performances from a mixture of the performances.

In some embodiments, an audiovisual file comprises a video portion synchronized with an audio track, wherein the video portion includes a performance of a work by a performing artist. In these embodiments, a dynamic point referencing method can be included within the musical work for an accurate and precise selection and cycling of a desired portion of the synchronized audio and video portions by the learning artist. The dynamic point referencing can include a tempo map of the musical work that is adaptable for a plurality of tempos within the musical work. The accuracy and precision of the selection of the desired portion of the synchronized audio and video data provides an instructional tool that is valuable to the learning artist. For example, a dynamic point referencing of the musical work can provide accuracy and precision in the selection of the desired portion when using the methods provided herein. The tempo map can include a plurality of tempos or a complex tempo, in some embodiments. It should also be appreciated that the tempo map can represent a fixed tempo in some embodiments, such that the tempo map comprises a single tempo in a substantial portion of a work, and even consists of a single tempo throughout the work.

The teachings are also directed to a method of creating the instructional musical work. The method comprises selecting the musical work, which may contain either synchronized video and audio tracks, or either file independently, mapping the musical work to provide a customized tempo map for an accurate and precise selection and of the music by the learning artist, and indexing the audio track with the tempo map.

The teachings are also directed to a method of learning music through an accurate and precise digital audio/video instructional process. The method comprises obtaining the instructional musical work, the audio track or tracks including a multi-track audio file produced from a multi-track audio recording. The multi-track audio file can comprise isolated instrument audio tracks and residual tracks, and the isolated instrument audio tracks can comprise multiple single audio tracks playing a preselected piece of music that a learning artist desires to learn on a preselected musical instrument. The method also includes transforming the composition of the multi-track audio files to have a of (i) the isolated instrument audio tracks to (ii) a residual track or tracks. In these embodiments, the residual track represents a subtraction of the isolated instrument audio track from the plurality of audio tracks, and the gain ratio is selected by the learning artist. The method also includes emulating the preselected piece of music by selecting and the desired portion, watching the video portion in the desired portion, listening to the isolated instrument audio track or tracks in the desired portion, and playing the preselected musical instrument to emulate the desired portion to create an emulated instrument audio track. Moreover, the method includes recording the emulated instrument audio track on a non-transitory computer readable storage medium, combining the emulated instrument audio track with the isolated audio track to transform the custom digital audio file into an educational audio file, listening to the emulated audio track to identify deficiencies of the emulating by the learning artist, and repeating the emulating, recording, combining, listening until the learning artist has learned the preselected piece of music on the preselected musical instrument to the learning artist's satisfaction. It should be appreciated that the can be a ratio of track volumes that is greater than or equal to 0.

The emulating can include selecting the desired portion, watching the video, listening to the isolated instrument audio track in the desired portion, and playing the preselected musical instrument to emulate the desired portion. And, in some embodiments, the emulating further comprises reading a digital musical transcription and tablature display corresponding to the isolated instrument audio track. In some embodiments, the custom digital audio file further comprises an audible dynamic point reference track. As such, the emulating can also include listening to the audible dynamic point-reference track that is designed for the preselected piece of music. In some embodiments, the playback speed can be controlled, or the tempo adjusted, such that the desired portion plays back at a desired speed that matches the ability of the user. Moreover, In some embodiments, the method further comprises recording the emulated instrument audio track on a non-transitory computer readable storage medium; combining the isolated instrument audio track with the residual component track to create an educational audio file; comparing the user's emulated instrument audio track to that of the performer's isolated audio track; and, repeating the emulating, recording, combining, and comparing until the user has learned the preselected piece of music on the preselected musical instrument to the user's satisfaction.

One of skill will appreciate that the instructional musical work having the audio/video combination provides an excellent learning tool, and this tool can include other features. In some embodiments, the emulating further comprises reading a digital musical transcription and tablature display corresponding to the isolated instrument audio track. In some embodiments, the custom digital audio file further comprises an isolated index track, the method further comprises listening to the isolated index track that is designed for the preselected piece of music. And, in some embodiments, the synchronized audio and video of the desired portion plays back at a desired speed that matches the ability of the learning artist.

The teachings can also be directed to an audio/video system for learning music. In some embodiments, the system includes a processor, an input device operable to receive audio and video data on a non-transitory computer readable storage medium, and a database operable to store synchronized audio and video instructional files for access on a non-transitory computer readable storage medium. In these embodiments, the system includes a transformation module embodied in a non-transitory computer readable storage medium, wherein the transformation module is operable to transform a multi-track audio file comprising an isolated instrument audio track and a residual track into a ratio of (i) the isolated instrument audio track to (ii) the residual track. The residual track can represent a subtraction of the isolated instrument audio track from the plurality of audio tracks, and the transforming can result from a learning artist selecting a between the isolated instrument audio track, the residual track, and the click track. In these embodiments, the system also includes an emulation recording module embodied in a non-transitory computer readable storage medium, wherein the emulation recording module is operable to record the learning artist's emulated audio track on the computer readable storage medium; and, an integration engine embodied in a non-transitory computer readable storage medium, wherein the integration engine is operable to combine the isolated instrument audio track with the residual track to transform the multi-track audio file into an educational audio file. Moreover, in these embodiments, the system includes an output module embodied in a non-transitory computer readable medium, wherein the output module is operable to transmit synchronized audio and video data to an output device in the form of an accurate and precise selection of a desired portion for a of the desired portion of the synchronized audio and video portions by the learning artist; and an output device operable to provide a synchronized audio and video data to the learning artist, wherein the combination and of the synchronized audio and video data assists the learning artist in learning a preselected piece of music.

It should be appreciated that the input device can comprise an internal or external microphone, an external line or microphone level input, and a camera or other video input device, for example; and, the output device can comprise a speaker, video output device, line output and graphical user interface. In some embodiments, the output module transmits music transcription and tablature data to a graphical user interface. The output module can also have a recalibration function operable to recalibrate an audio data track output to correct for a latency in the output of the audio track data. And, in some embodiments, the output module can have a synchronization function operable to synchronize the music transcription and tablature data display on the graphical user interface with the isolated instrument audio track provided to the listener through the speaker.

In some embodiments, the audio file further comprises an index track. In these embodiments, the transformation module is operable to transform the multi-track audio file into a of (i) the isolated instrument audio track, (ii) the residual track, and (iii) the index track, wherein a between the isolated instrument audio track, the residual track, and the index track is selected by the learning artist.

The system can be operable to communicate with external computer readable media. In some embodiments, the system further comprises a data exchange module embodied in a non-transitory computer readable medium, wherein the data exchange module is operable to exchange data with an external computer readable media.

In some embodiments, the system can be operable using a hand-held device. And, the system is operable to function as a particular machine or apparatus having the additional function of telecommunications, word processing, or gaming. Likewise, the system can be operable to function as a particular machine or apparatus not having other substantial functions.

In some embodiments, the system consists of a handheld apparatus. And, the handheld apparatus can be designed to have no other substantial functions. Likewise, the handheld apparatus can be a smart phone, or another type of handheld computing device having other substantial functions.

Figure 5:
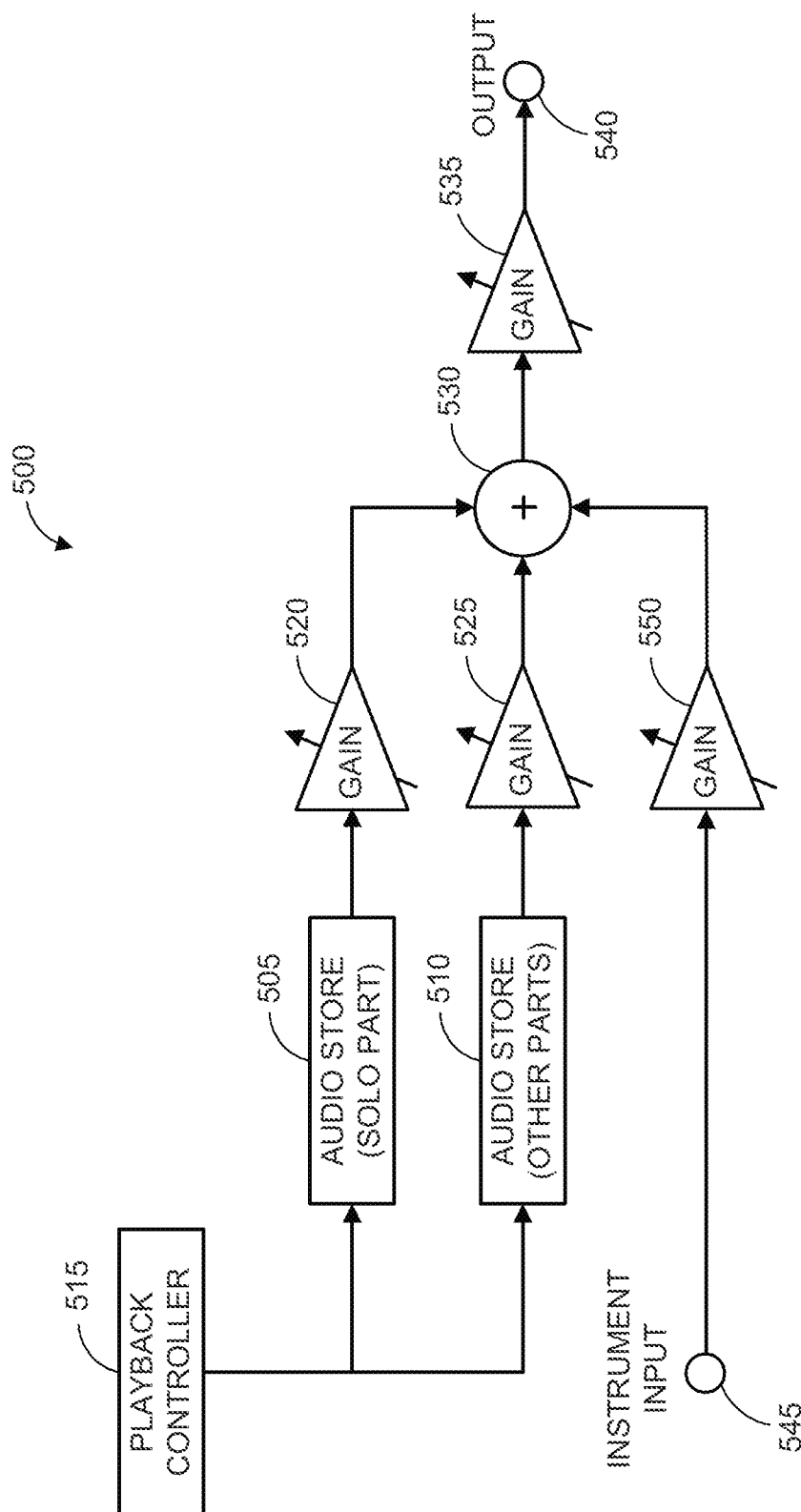
FIG. 5 illustrates a circuit diagram of the system according to some embodiments.

FIG. 5 illustrates a circuit diagram of the system, according to some embodiments. The solo audio part (the part to be learned) is retained in an audio store 505, and the audio recording of the other parts of the composition are retained in an audio store 510. Storage areas 505 and 510 may reside in separate devices or in a single storage device, but can be accessed separately. The progressive retrieval of audio information from stores 505 and 510 is controlled by a playback controller 515 such that the various parts of the composition become synchronized in time. The solo audio signal can pass through a variable gain element 520 so that it's volume level in an overall output 540 can be controlled. Similarly, the other audio signals pass through a gain element 525 and are fed to a mixing element 530, to be combined with the solo instrument audio signal provided from gain element 520. A similar circuit diagram can be used for video stores.

An external instrument input element 545 enables an external audio source, such as the practice instrument, to be included in overall output 540. The signal provided by instrument input element 545 passes through a gain element 550 before delivery to mixing element 530.

The overall output level can be controlled using a gain element 535, which receives an input signal from mixing element 530 and feeds an output signal to overall output 540. The various gain elements can be controlled directly through user controls or through signals from a controlling device such as a microprocessor. In some embodiments, other parts of the musical performance may be stored in separated storage areas to facilitate the learning process or to accommodate multiple players.

Figure 6:
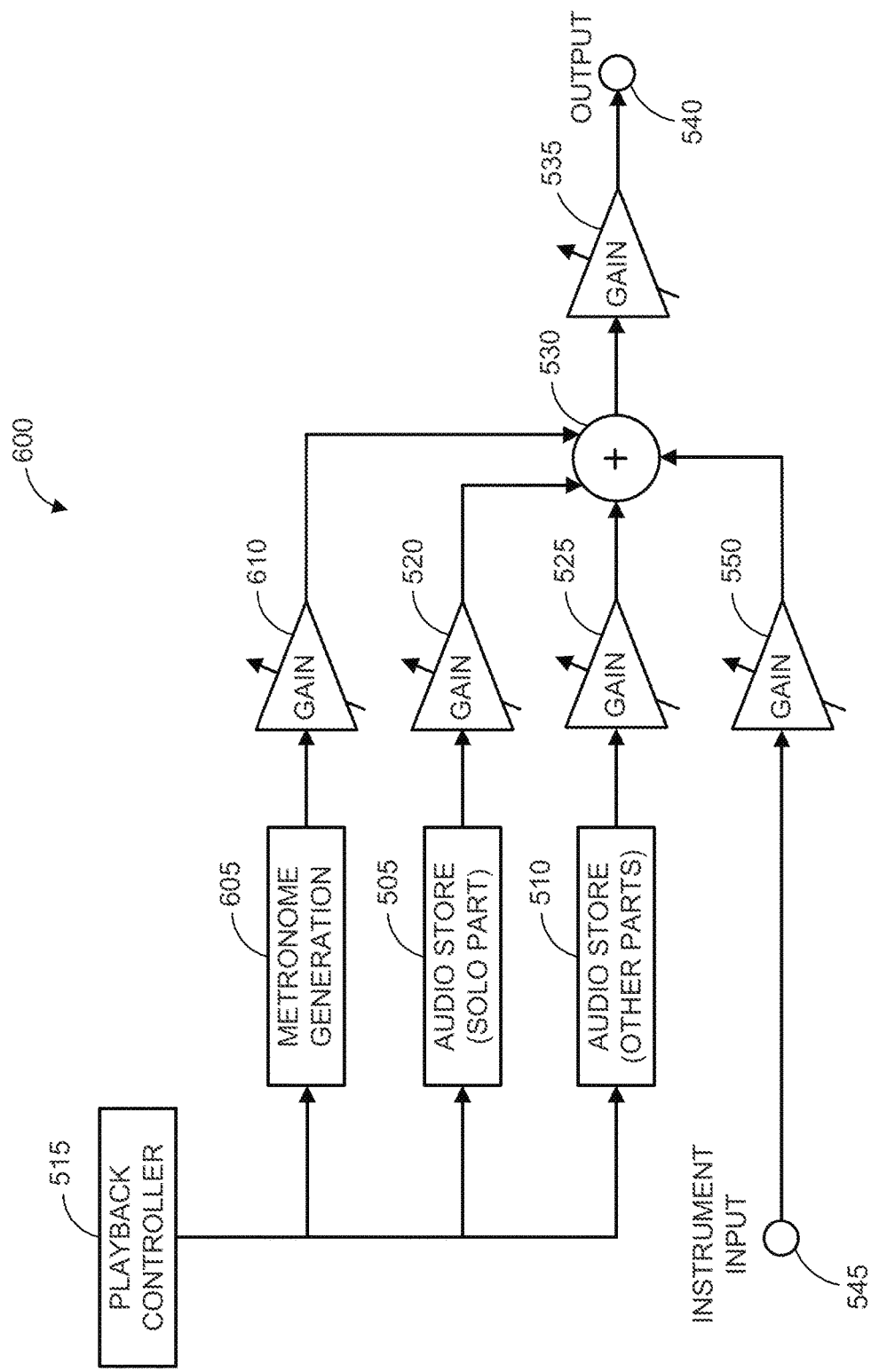
FIG. 6 illustrates a circuit diagram of the system including a click function, according to some embodiments.

FIG. 6 illustrates a circuit diagram of the system including a click function, according to some embodiments. An audible timing reference, or dynamic point reference, is included into the signal provided to the output of the device. This timing reference may be a periodic sound such as a click, beep, or a tone, which can be recorded and stored in a method similar to that used for the other audio signals, or which may be synthesized by an audio signal generator 605 while the musical piece is being played. This additional sound is delivered to mixing element 530 via a variable gain element 610, which allows the audible level of the dynamic point reference to be adjusted.

In some embodiments, the dynamic point reference can be created from a tempo map, such that the dynamic point reference, or indexing, is variable over time, rather than constant. Many musical works cannot be accurately mapped using a constant timing reference, as these works can be found to have, for example, variable and unpredictable tempo changes during the course of the performance of the musical work. And, this is particularly true of original musical works, such as those found in the original multi-track master recordings that are the subject of many embodiments of the teachings provided herein.

Sheet music, for example, can be obtained for such original musical works, and these are generally expected to comprise transcriptions of an original and complex variance of tempos into a constant tempo. The teachings provided herein, however, do not use a constant tempo but, rather, are based on a custom tempo mapping, for example, of an original recording providing a dynamic point reference that is substantially identical to the originally recorded work. Traditional sheet music, or digital sheet music (e.g., pdf scans of sheet music), of popular music provide a derivative musical work that is, in most cases, transcribed much different than the originally recorded musical work. Traditional sheet music, for example, generally uses repeated sections that ignore the nuances that occur in an original musical work. The teachings provided herein, however, do not use such repeated sections, but rather are linear and verbatim representations of the original work transcribed from the original, isolated instrument tracks of an original master providing a transcription of the work that is transcribed to be substantially identical to the originally recorded work.

Figure 7A:
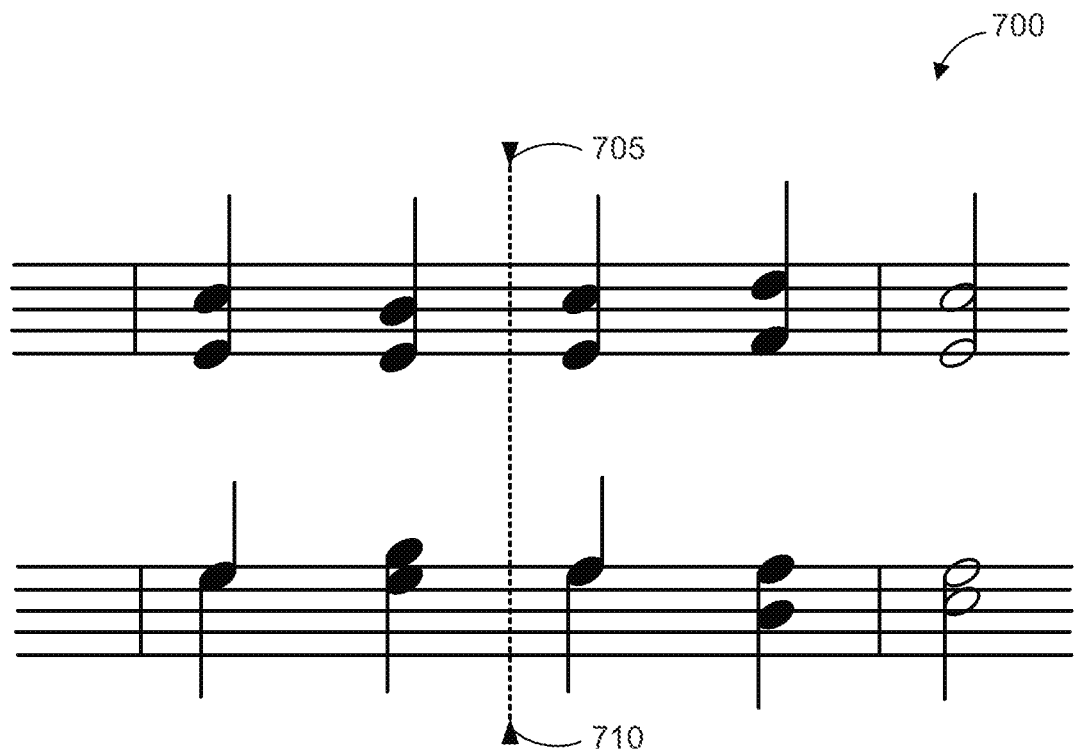
FIGS. 7A and 7B illustrate a musical notation display designed for use with the system, according to some embodiments.
Figure 7B:

FIGS. 7A and 7B illustrate a musical notation display designed for use with the system, according to some embodiments. In some embodiments, a display provides an animated graphical representation of the musical notation relative to the part to be learned, whereby such graphical representation scrolls along the display area in synchronism with the audio music signal. In FIG. 7A, for example, a time region 705,710 of the display area is marked to identify the present moment, with the graphical representation of the music moving past time region 705,710 as the music part is being played. By this arrangement, the display area enables a player to see musical events in advance that are immediately following the present moment. In some embodiments, a recent musical notation may also be seen in retrospect. In FIG. 7B, for example, a desired portion of the musical work is accurately and precisely selected for cycling, as shown by the broken line, in which the speed of the cycled portion can be adjusted for the skill level of the user. Moreover, the size of the broken line box can be reduced to a very high resolution to capture nearly any desired time increment in the work, for example, a small set of beats, a single beat, a fraction of beat, and the like. Accordingly, the apparatus and methods of presenting musical notation are advantageous for at least the reason that a user is provided with a temporal context, tempo speed adjustments, and video matching of the same for the musical events of interest.

Moreover, and contrary to traditional sheet music notation, the scrolling of the music can be continuous, removing the need for page turns. And, as described herein, the scrolling of the notation can reflect the variable and unpredictable tempo changes of an original, multi-track master, rather than a derivative work produced using a constant, or substantially constant, tempo. Having the function of digital indexing with the tempo map, as described herein, allows for an accurate and precise selection of the desired portion of the musical work, as well as an accurate and precise cycling at any tempo desired by the user. A tempo can be referred to as "substantially constant," for example, where it was not created to reflect the variable and unpredictable tempo changes of the original, multi-track master. It should be appreciated that a transcriptionist of music could vary tempo from time to time in a musical work, but one of skill would consider such tempo changes to be substantially constant in view of the variable and unpredictable tempo changes that can occur from the original performance by the original artist as found in an original, multi-track master recording.

Figure 8A:
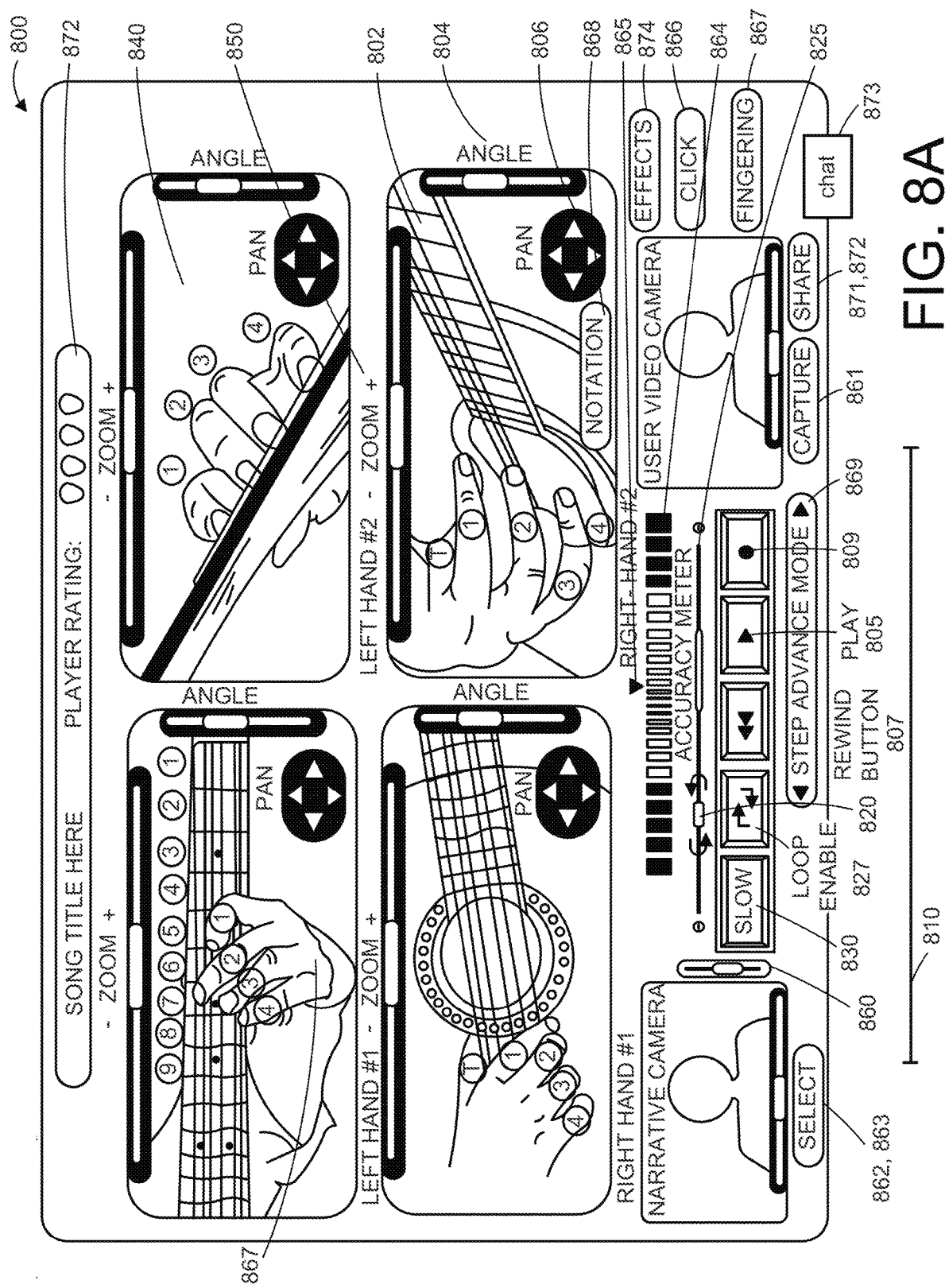
FIGS. 8A-8C illustrates the system with a variety of functions for a variety of musical instruments, according to some embodiments.
Figure 8B:
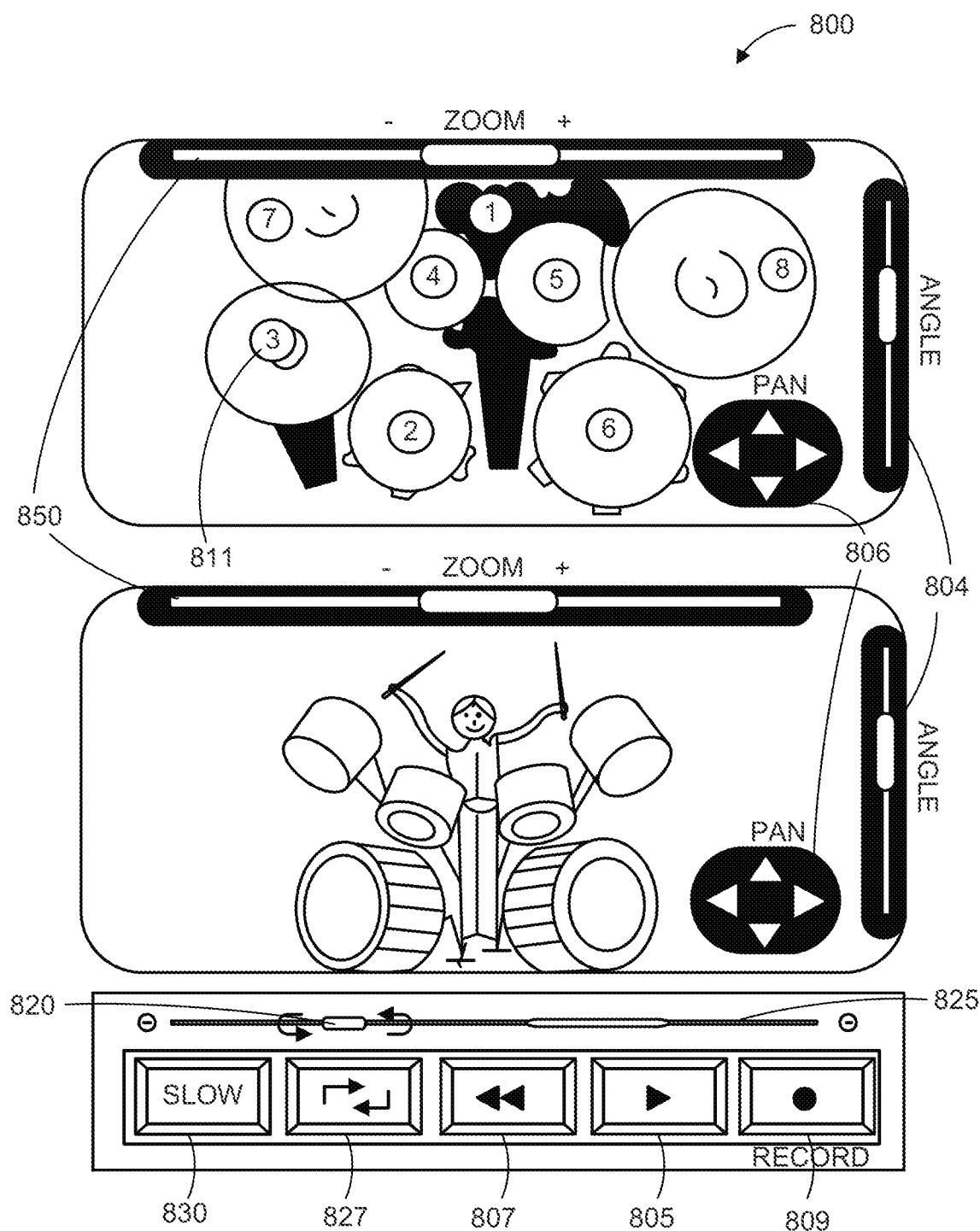
Figure 8C:
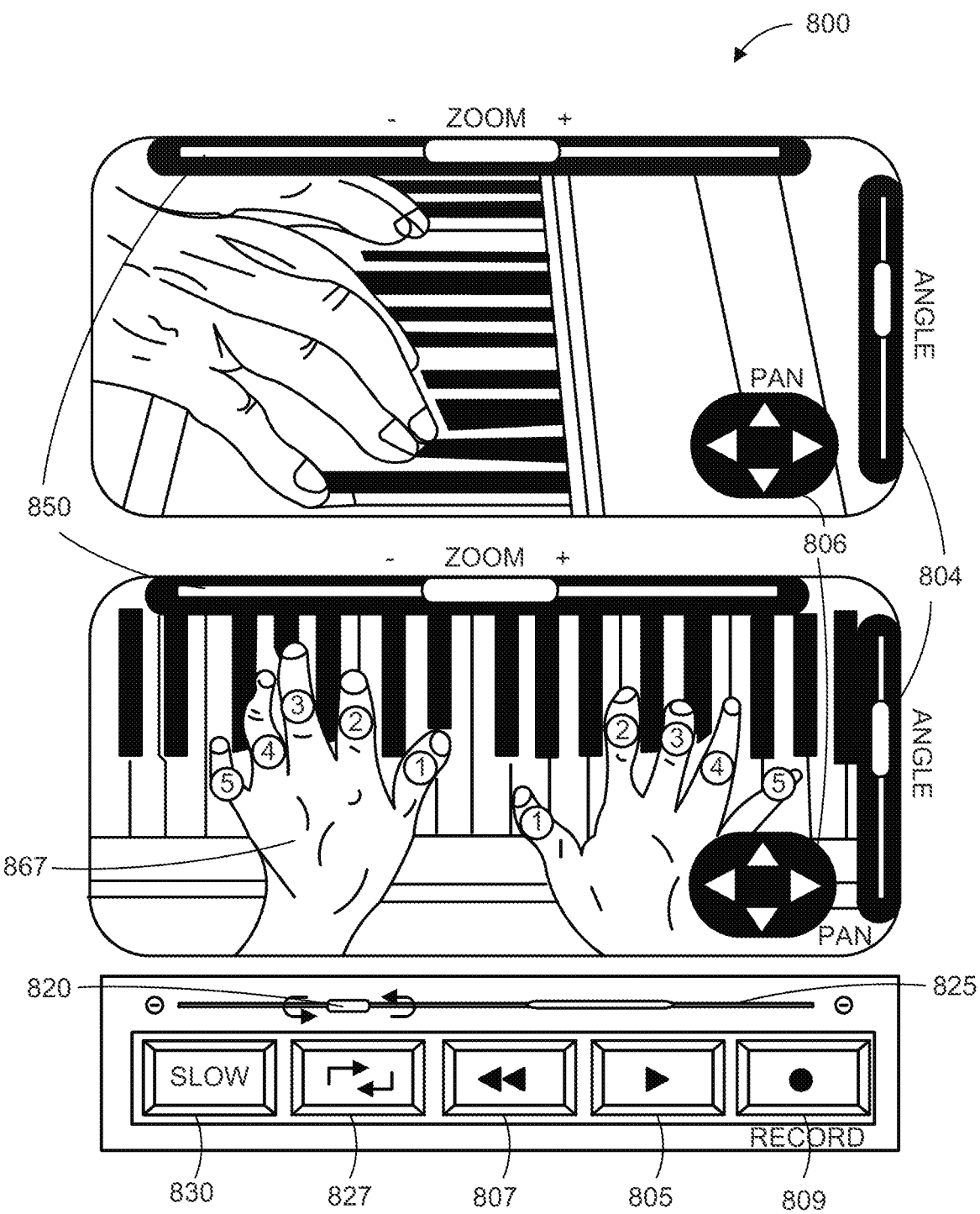

FIGS. 8A-8C illustrates the system with a variety of functions for a variety of musical instruments, according to some embodiments. In FIG. 8A, the system gives the user the standard play 805, rewind 807, record 809, and a transport control 810 to control the location and cycle points of the video/audio. The transport control 810 also gives musicians the ability to quickly reference different sections of a song, create custom markers, select point-cycling function 820 that snap to a grid and slow the audio down using a slow down enable button 830 without changing the pitch. The timeline 825 for the musical work can also be indicated, for example, by a horizontal time bar. The point-cycle enablement button 827 allows the user to using the point-cycling function 820. Users can select multiple windows containing various video angles 840 and rearrange them on the device's screen. Users will appreciate the ability to control the zoom level of each window using a zoom control 850 containing the various video angles. It should also be noted that the musician may not know how to read standard notation or guitar tab and could greatly improve his skill using this technique of identifying cycle points, choosing the appropriate camera view, adjusting the zoom level and slowing down the track until the identified section has been perfected. At this point, the user can gradually begin to speed up the tempo using a control for adjusting the amount of slow down 860 and practice the identified part until it can be played at regular speed. FIG. 8B shows that the learning artist can be a drummer, and FIG. 8C shows that the learning artist can be a keyboard player. FIGS. 8A-8C are discussed further in the examples below.

As shown in FIG. 8A, the learning artist can be a guitar player. A guitar player could quickly and easily select a desired portion of an instructional musical work, for example, a difficult 2 bar section, and cycle it so that it repeats as many times as desired. A computer screen could display multiple video angles at the same time on different parts of the display. One section of the display, for example, could show an instructional artist playing, using his fingers with a pick. Another section of the display, for example, could show the instructional artist's fingers on the fret board of the guitar. Other angles could be provided including, but not limited to, a front view, overhead view, a player's point of view, etc.

If the learning artist is still having trouble mastering this selection he could also choose to slow down the speed to a point that is within his ability to master the section. This would allow the musician to clearly see exactly where he should pick a certain string on one hand or show which fret to depress with the other hand. He could begin to increase the tempo as he gains more confidence and eventually play the section at the original tempo.

As shown in FIG. 8B, a drummer could select a difficult drum-fill in a song as a desired portion of the instructional musical work. For example, the methods provided herein allow the drummer to quickly, accurately, and precisely select and cycle, perhaps, a one bar section that he wants to learn. The musical piece can be simple or complex, and the audio/video compilation would assist in teaching the learning artist how to master the section.

For example, the video display could show a drummer with an extensively large setup, and the learning artist may want to design a customized screen selection that focuses on the toms. And, the design can have substantial flexibility, allowing the learning artist to select multiple angles, as well as a variety of magnifications. The learning artist, for example, may find it appropriate to zoom in on the over head video angle to best understand the selection of toms that an instructional artist is striking in the selected section. As shown in FIG. 8B, the drums can be indicated by numbers 811, and the sequence of play can be explained in this manner, for example, to the user.

As shown in FIG. 8C, a keyboard player may find it useful to examine the exact fingering that an instructional artist is using in a desired portion of a performance. Visualizing an exact fingering can be very useful to a learning artist, as the selection of which fingers to use on the selected keys can make it much easier to perform a difficult passage in a musical work.

Having the ability to select the desired portion with accuracy and precision, as well as view a synchronized video portion corresponding to that desired portion, and being able to reproducibly select and repeat a around the desired portion, can provide an unprecedented valuable learning tool. Such information will be appreciated by one of skill as a valuable learning aid, as well as by the learning artist or, in fact, by any keyboard player that didn't learn to play using a teacher or utilizing the classical fingering techniques.

As shown in FIG. 8A, the system 800 can include an instruction for any instrument, such as a guitar 802, and performance can be rated 872. The system 800 can include a video camera feature 861 that allows users to video themselves playing and superimpose or compare the user captured video to instructional video, and this feature 861 can also generate animations of the user, in some embodiments, using a motion-capture camera. Viewing angle adjustment 804, and a panning feature 806, can be a standard feature. In some embodiments, the system includes a narrative video/audio track through a narrative camera function 862 that gives the user information or instruction pertaining to the song. In some embodiments, the system includes a narrative teacher feature 863 to select from a variety of different narrative teachers that may include celebrities or popular artists. Moreover, the system may also have an accuracy feature 864 that automatically compares the audio/video from a user's performance to the instructional audio/video as a measure of the user's performance. The accuracy feature 864 can even serve as real time feature that notifies a user when a wrong note has been performed.

In some embodiments, the system includes an option that stops the user when he makes a mistake. In some embodiments, a tolerance option 865 can define the amount of tolerance that system will allow before stopping the user or indicating that a mistake has been made. And, in some embodiments, a multi-channel playback engine would let the user isolate and balance the audio level of the instructional instrument, the residual component track, the click track and any other instruments that may be isolated within the session.

In some embodiments, the system includes a click track 866 that helps the user keep time with the song. And, in some embodiments, the system 800 has an ability to provide a visual representation 867 of the suggested finger placement on instrument (i.e. #1 corresponds to thumb, #2 index figures, etc.). Moreover, the system can have an a notation enabling function 868 to provide the user with a notation screen as well as a video screen as an additional learning tool.

In some embodiments, the system has a note to note function 869, with the capability for users to advance note to note (set to a specific note value-⅛, $16^{th}$, quarter, half notes, etc.) at their own pace using a step advance mode. This would allow the learning of difficult musical passages by viewing the displays and hearing the notes in a non-real time "move-on when you're ready" method.

The system could also include a plurality of communities or social networks that include like-minded musicians or fans that can compare their skill level or exchange tips and lessons. As shown in FIG. 8A, a player may submit and share through a community share function 871, sharing a recorded performance 872 with the community and display the grading or skill level that has been achieved on a per song basis or an overall average ability rating. In some embodiments, the performance may be graded by the host or celebrity narrative chosen.

A user could have a video chat enabling feature 873 as an access to the online community to get direct feedback or tips from other users utilizing a video chat system. And, in some embodiments, a player may receive points for his performance and achieve a level of status in the community. The system could also be designed such that a player may exchange his points with other members or redeem his points for a variety of goods or services within the community or the company. In some embodiments, a player may be rewarded or graded on his appearance as it pertains to certain communities or predetermined genres.

In some embodiments, the system could include an instrument sound modeling option 874 that could synchronize a sound modeling processor or fx processor that matches the tone of the chosen song and automatically adjusts and changes with the unique tonality of each particular section of a song. And, in some embodiments, the system could also give the users feedback on the quality or their sound as it pertains to their chosen instrument or the selected song.

The systems taught herein can be in a device that can be configured for use with any musical instrument, for example, guitar, piano, drums, or a vocals. For example, such a device can be configured for use with a piano. The device can be substantially limited to the teachings herein and include a housing or container of any shape, such as a shape designed to sit on top of a piano in place of standard sheet music. A music display may be included as a liquid crystal display (LCD) screen or other type of display screen, and one or more transport buttons such as, for example, a play button, a stop button, and a pause button, can be provided. Such a device can comprise a number of controls, which may be configured as knobs or other similar state selectors known in the art. The device can include a first group of state selectors that relate to the "blender" function of the device and are structured to control the user's input, the music without the piano contribution, and the piano itself. A second group of state selectors can be provided to relate to the "master" function of the device and control volume, click track, and tempo. A third group of state selectors can be provided to control the on/off function of the device and may include indicator lights, light intensity control, and additional playback controls, for example. The device can also include one or more speakers, a sound module for electric pianos, and one or more ports for connecting the device to other units such as, for example, USB ports, phono jacks, and power jacks, or perhaps musical instruments, such as electric organs and guitars, for example. In some embodiments, a USB port may be used to connect the device to a computer system. In some embodiments, for example, the USB port allows for downloading of audio data to a larger computer memory storage location. In some embodiments, data may also be supplied to the device and and/or stored in removable data memory cards.

In some embodiments, the multi-track audio files are produced from original multi-track recordings, and these recordings may originate on analog tape, such as analog multi-track tape (e.g. 1 track to 24 tracks), a digital tape format (e.g. pulse code modulation, PCM, digital tape format). In some embodiments, an analog tape format is first transformed into a digital recording and a multi-track audio file is produced from the digital recording. In some embodiments, the original mix is recreated by taking all of the different tracks and making the mix to simulate the original recording. The mixing can be a manual process and can be done with an analog console, new digital console, or the mix can be done on a computer using basically any mixing technique known to one of skill. In some embodiments, older analog tapes need to be restored, such as by a baking procedure, before attempting a recreation.

It should be appreciated that the teachings can apply to any piece of music containing virtually any musical instrument including, but not limited to string instruments, brass instruments, woodwind instruments, percussion instruments, and vocals. In some embodiments, pieces of music having variable tempos, rhythms, and beats can be learned with more ease due to the manually created and variable metronome function, as well as the manually created audio files having superior isolated instrument audio track quality. In some embodiments, songs are complicated and have changing or otherwise un-isolatable beats that would be more difficult to learn without the teachings provided herein.

Figure 10:
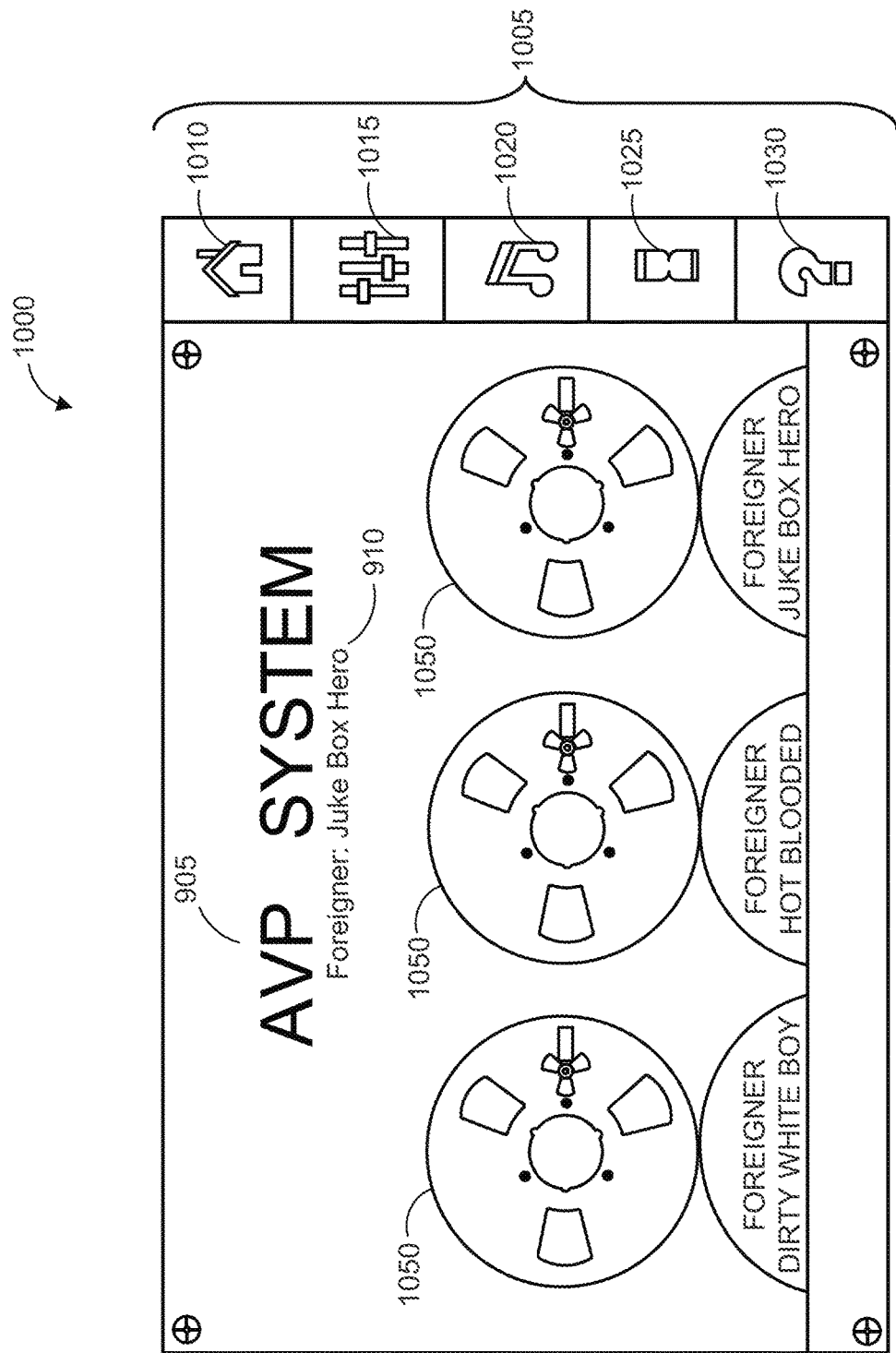
FIG. 10 illustrates a display for a graphical user interface offering selections within a track list of a multi-track audio recording set designed for use with the system, according to some embodiments.

The user will often have a set of multi-track audio files to learn on the system. FIG. 10 illustrates a display for a graphical user interface offering selections within a track list of a multi-track audio recording set designed for use with the system, according to some embodiments. Track List Display 1000 shows the selections in a multi-track audio recording set or track list 1050. The user chooses an audio file and proceeds to the menu bar 1005 to select a function from home page 1010, volume/fader page 1015, music transcription and tablature 1020, cycling page 1025, and help page 1030.

Figure 11:
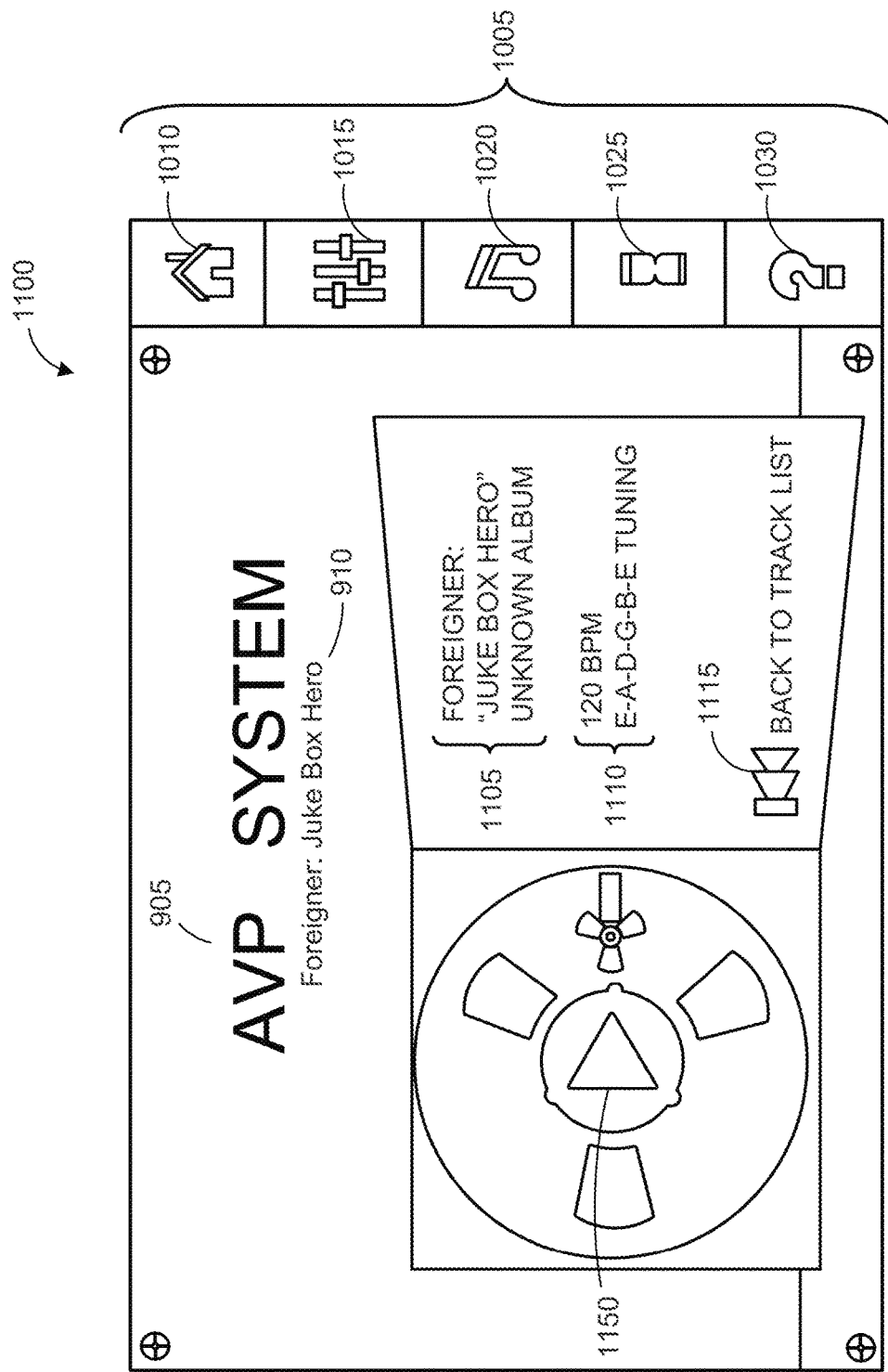
FIG. 11 illustrates a display for a graphical user interface offering information on the track list selection in the system, according to some embodiments.

The user can access an information page regarding the piece of music selected from the track list, such as the band, song title, album, tempo, and tuning. FIG. 11 illustrates a display for a graphical user interface offering information on the track list selection in the system, according to some embodiments. Information Display 1100 provides the user with the selection bibliographic information 1105 containing information on the band, song title, and album, and selection technical information 1110 provides information on the tempo and tuning for the selection. Play function 1150 allows the user to begin learning the selection.

Figure 12:
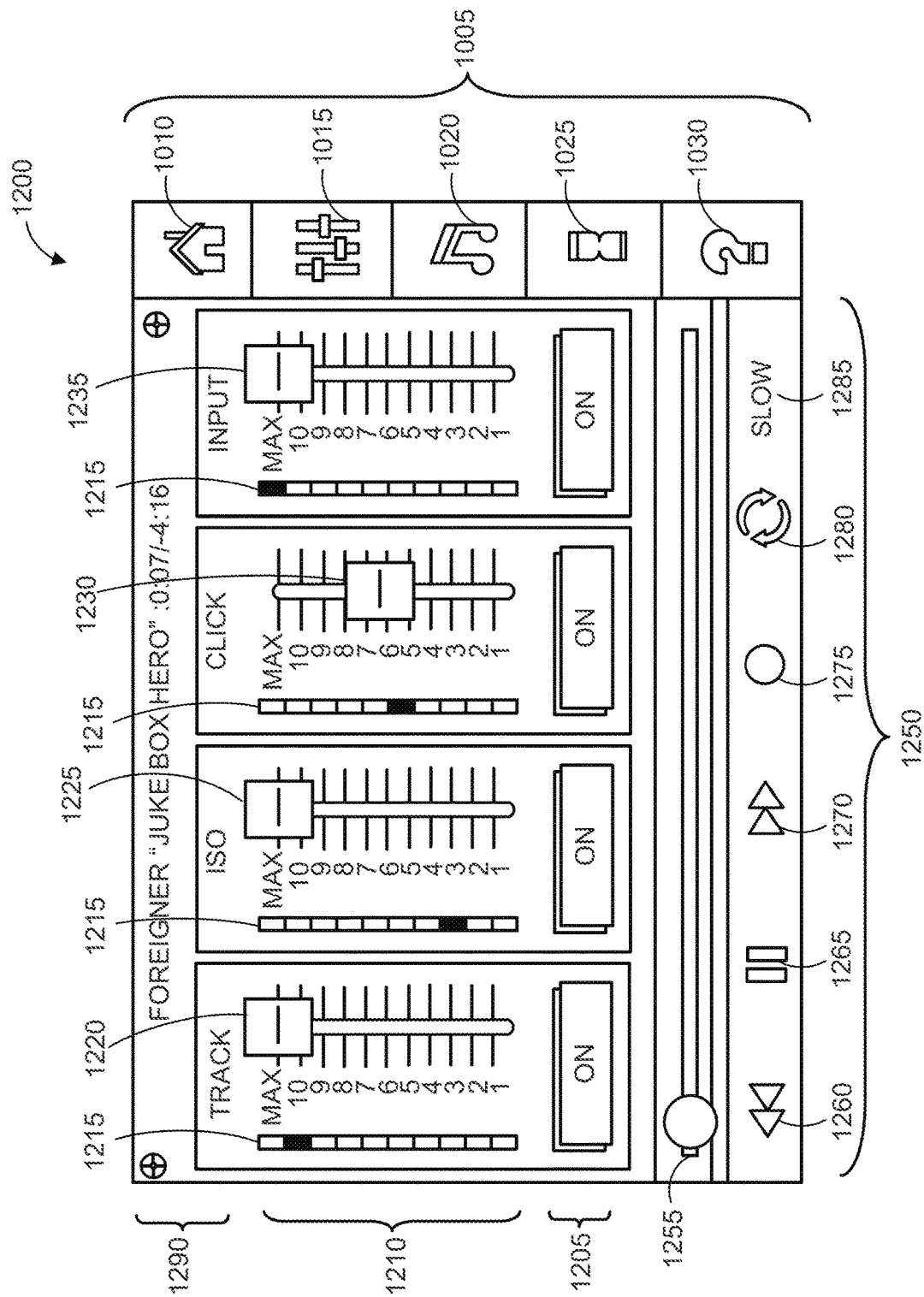
FIG. 12 illustrates a display for a graphical user interface offering state selections for track faders, volume fader control, and transport selections, in which all tracks are selected on a multi-track audio recording designed for use with the system, according to some embodiments.

The volume/fader page 1015 has several functions that enables a user to effectively learn and mix music. FIGS. 12-15 show various functionalities of the volume/fader page 1015. FIG. 12 illustrates a display for a graphical user interface offering state selections for track faders, volume fader control, and transport selections, in which all tracks are selected on a multi-track audio recording designed for use with the system, according to some embodiments.

Volume/fader display 1200 provides the functionality of track on/off (i.e. mute) control 1205 for each track file. The functionality of the volume/fader controls 1210 is provided by the volume indicators 1215 to indicate sound pressure level and the faders 1220, 1225, 1230, 1235 to adjust volume in the manner of a potentiometer or digitometer, for example. Transport section 1250 provides a time bar 1255 to indicate a position in the piece of music and can also contain markings, such as colors, to indicate the intro, pre-chorus, verse, solo, bridge, outro, chorus, and middle section, for example.

The transport section 1250 also provides several state selection functions: a rewind 1260, pause 1265, fast forward 1270, stop 1275 as normal transport control state settings; cycle 1280 to allow a user to repeat a desired section of the piece of music; and slow 1285 to allow the user to slow the song by a predetermined amount and serve the user as a function commonly known as a speed control, tempo adjustment, or tempo control. In some embodiments, the slow 1285 function can be a default setting (e.g. to slow by some percentage, such as 50%, 75%, or the like) and, in some embodiments, the user can define a desired speed setting. As such, in some embodiments, the playback controls can be to those found on about any tape deck or video cassette recorder, such as "previous", "next", "play", "pause", and "record". And, in some embodiments the playback controls include a "cycling" function to allow the user to cycle a particular section or measure over and over again until the user is satisfied in the learning experience.

In some embodiments, the transport section 1250 can be operable within a single functioning section of a system, such as a single page of a software application. In some embodiments, the transport section 1250 can be operable within a plurality of functioning sections of a system, such as in a plurality of pages of a software application, such that the transporting can occur quickly at the choosing of the user without having to move from one section of the system to another section of the system. A music label and timer 1290 is also provided as a reference data point for the user.

In some embodiments, the mixing of audio can be handled on an individual sample per track basis. Each track can be represented individually, having to keep track of its own samples, duration, levels and peaks, gain, and time. Once each track can be initialized and loaded out of its file, and then handed off to a subsystem to decode the compression and make samples. An example of a subsystem can include, for example Apple's COREAUDIO subsystem. After the samples are made available, the track can then be assigned to a master track handler object referred to as the mixer object, and saved recorded audio sessions can be loaded at this time as well. The mixer object primes the subsystem and initializes the output. In these embodiments, the touching of the "play" button can be used to start the mixer in its function of combining the audio within buffers, where the mixer calls out to each track asking it for its next frame of audio. The audio frames can be added to the playback buffer and enqueued, and all timing on the audio can then be synced to allow the audio to be synced to a subnote level to reduce or eliminate creep within tracks.

In some embodiments, the audio recording can be handled by a manner similar to the individual audio playback, where extensions to record to a file and store its place within a song can be used. Once the user clicks a record function, a recorder object can be built, and the object can then start a file and initialize the recording. Once initialized, the recording class can store the current play time within the song to the measure and begin. The user can tell the device to stop recording, and the object can then mark that time and store the duration of the data stream in a settings file. The audio data is then flushed to the file, a track handler object can then be created with its start time and duration set, and the mixer can be updated to allow future playback of the recorded audio along with the rest of the prerecorded audio.

Figure 13:
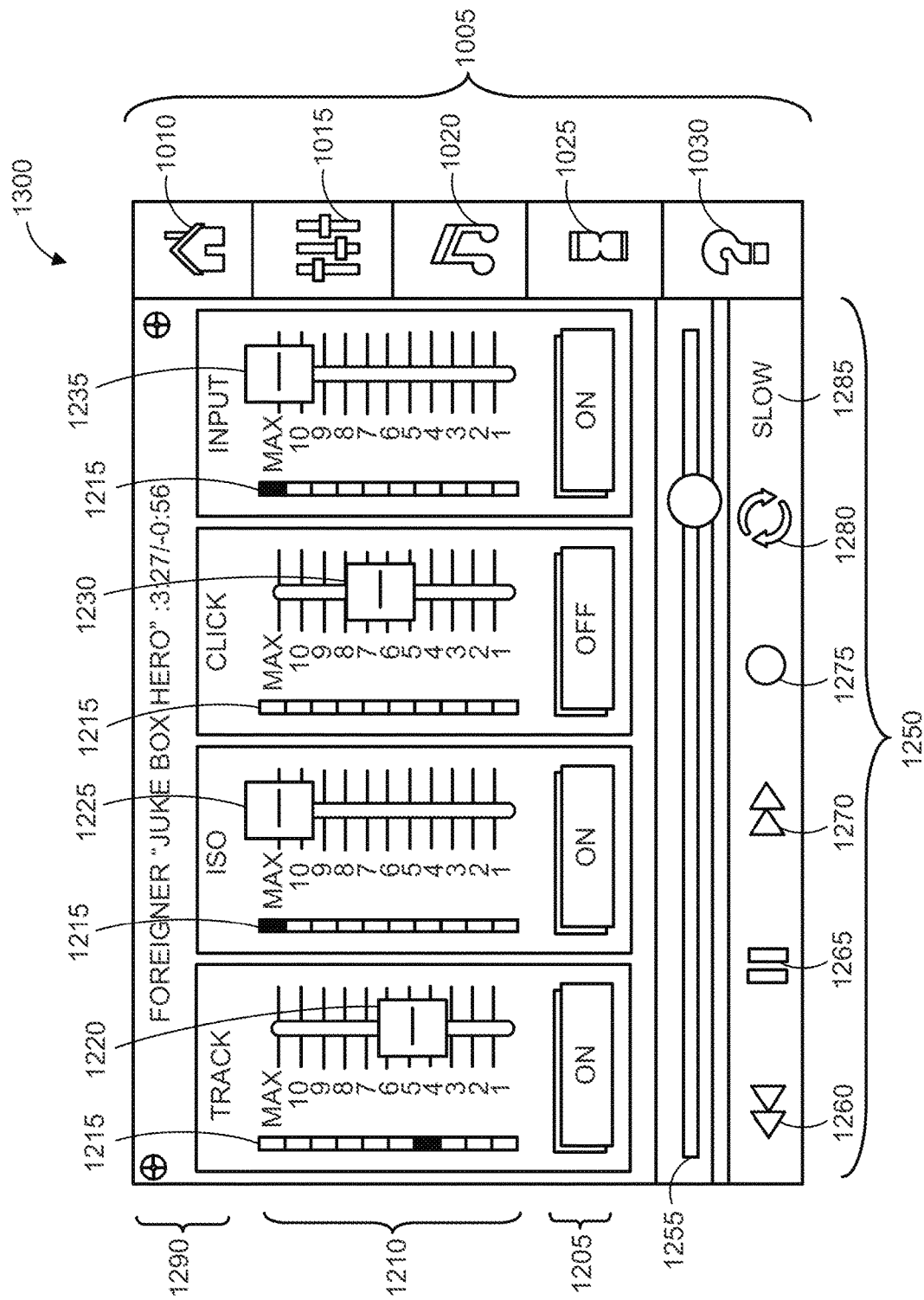
FIG. 13 illustrates a display for a graphical user interface offering state selections for track faders, volume fader control, and transport selections, in which all tracks but the click track are selected on a multi-track audio recording designed for use with the system, according to some embodiments.
Figure 14:
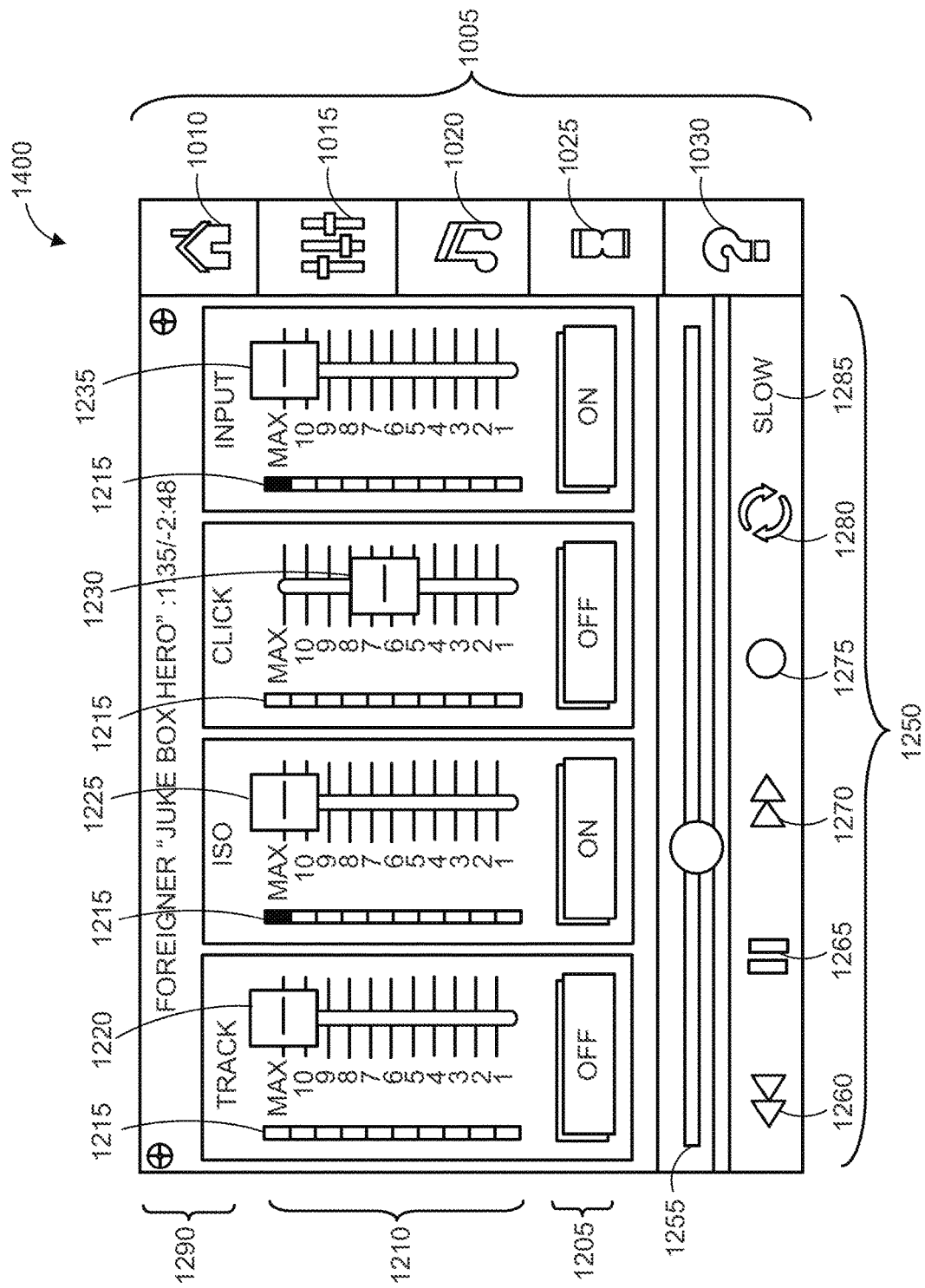
FIG. 14 illustrates a display for a graphical user interface offering state selections for track faders, volume fader control, and transport selections, in which only the isolated instrument audio track and the emulated instrument audio track are selected on a multi-track audio recording designed for use with the system, according to some embodiments.
Figure 15:
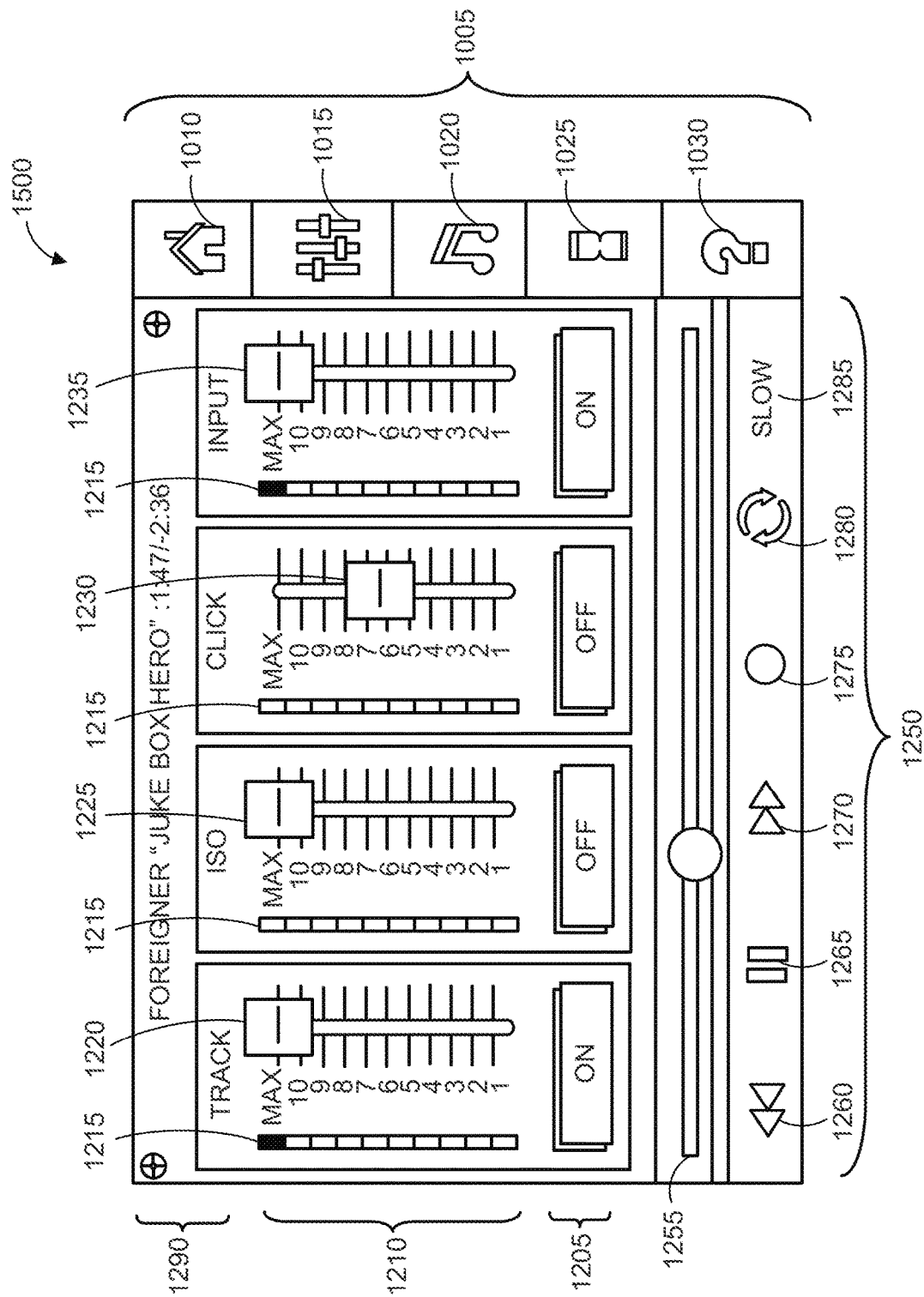
FIG. 15 illustrates a display for a graphical user interface offering state selections for track faders, volume fader control, and transport selections, in which only the residual track and the emulated instrument audio track are selected on a multi-track audio recording designed for use with the system, according to some embodiments.

FIG. 13 illustrates a display for a graphical user interface offering state selections for track faders, volume fader control, and transport selections, in which all tracks but the click track are selected on a multi-track audio recording designed for use with the system, according to some embodiments. FIG. 14 illustrates a display for a graphical user interface offering state selections for track faders, volume fader control, and transport selections, in which only the isolated instrument audio track and the emulated instrument audio track might be selected on a multi-track audio recording designed for use with the system, according to some embodiments. FIG. 15 illustrates a display for a graphical user interface offering state selections for track faders, volume fader control, and transport selections, in which only the residual track and the emulated instrument audio track are selected on a multi-track audio recording designed for use with the system, according to some embodiments.

Figure 16:
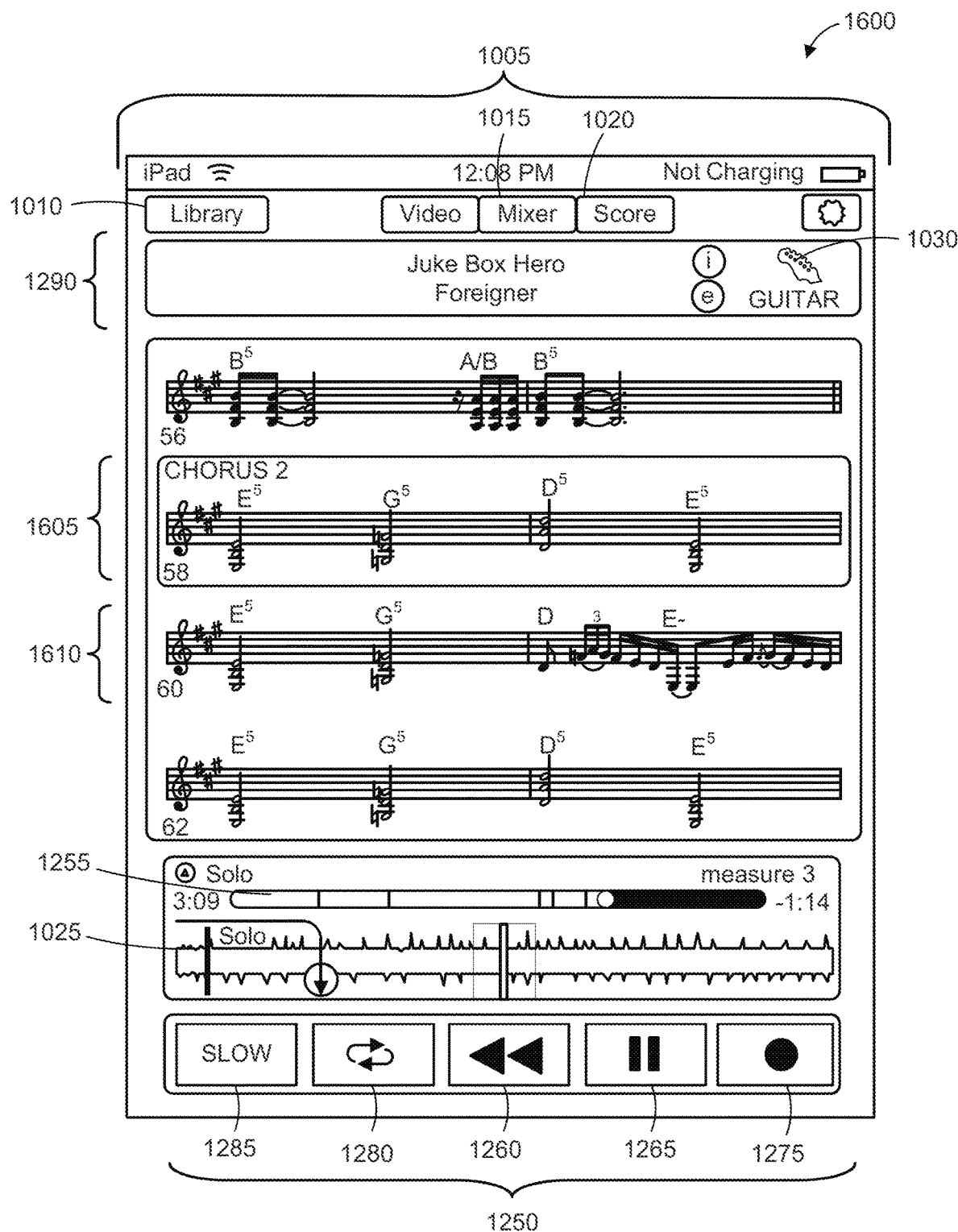
FIG. 16 illustrates a display for a graphical user interface offering musical transcription and tablature audio data, in which only the current section of music is shown for a multi-track audio recording designed for use with the system, according to some embodiments.

A user can benefit by reading music while playing. FIG. 16 illustrates a display for a graphical user interface offering musical transcription and tablature audio data, in which only the current section of music is shown for a multi-track audio recording designed for use with the system, according to some embodiments. Music transcription and tablature page 1600 provides the current transcription and tablature 1605 in a bright display and the upcoming transcription and tablature 1610 in a dim display, where the current represents the music currently playing, and the upcoming represents the music immediately following the music currently playing. Each measure, for example, can have a timecode and duration that represents where in the song's timeline that measure is played. Using that information along with the song's current playback position, the tablature can be synchronized along with any playing audio. Each measure can be designed to display notes or chords and which strings or frets to use. In some embodiments, a user may desire a standard music scale for display. The musical transcription and tablature can also be a dynamic, scrolling display, in some embodiments.

Figure 17:
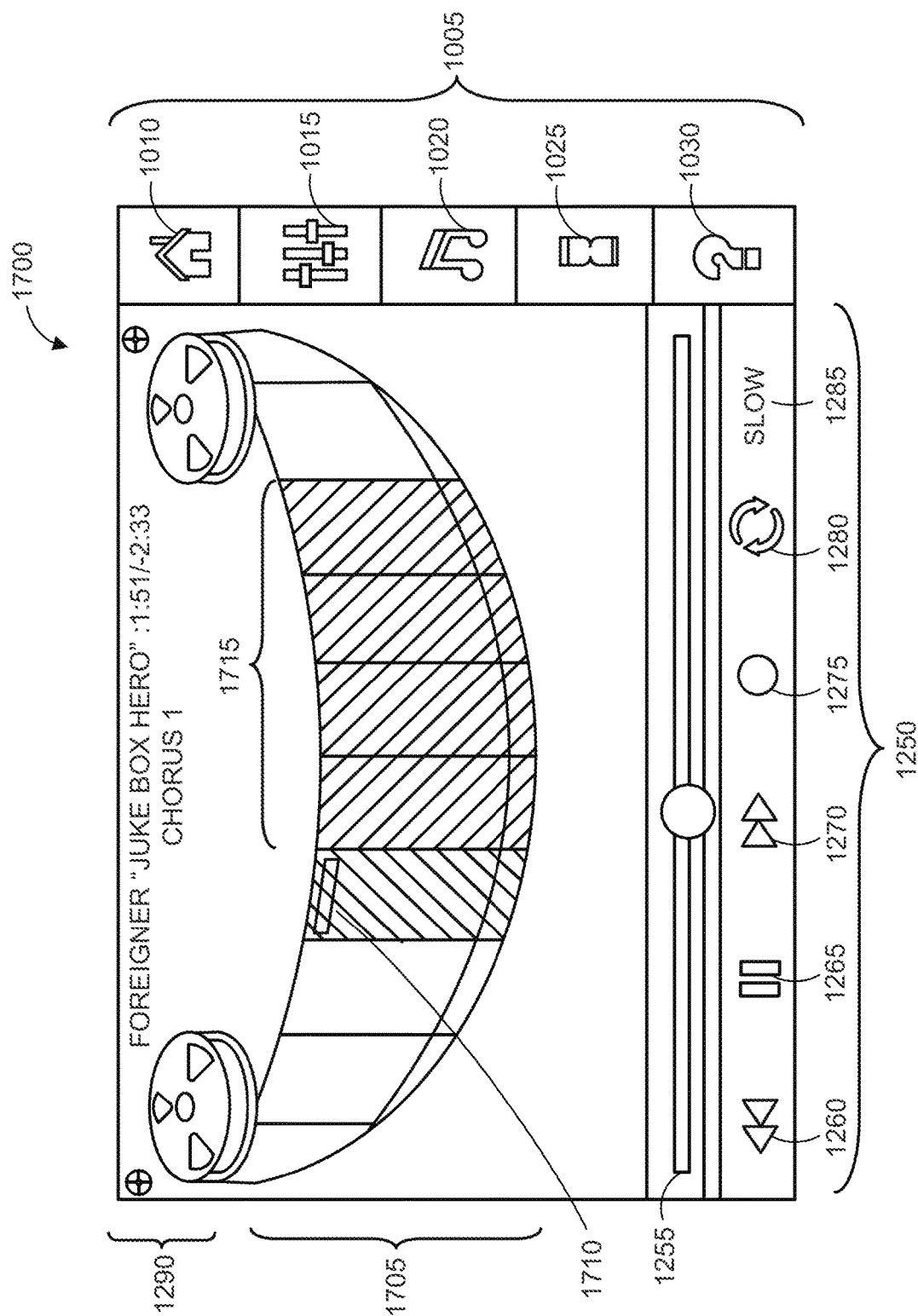
FIG. 17 illustrates a display for a graphical user interface offering selection of a section of a piece of music by bar or set of bars in a multi-track audio recording designed for use with the system, according to some embodiments.

A user can also benefit from a function that allows for an isolation of a particular section of a piece of music in an audiovisual work, as well as a cycling of that section to enable the user to focus and practice on that section of the music. FIG. 17 illustrates a display for a graphical user interface offering selection of a section of a piece of music by bar or set of bars in a multi-track audio recording designed for use with the system, according to some embodiments. Cycling page 1700 displays section 1705 of the digital audio file, and bar 1710 or bars 1715, for example, can be isolated and selected for playback by the user. The user can then use the methods taught herein to focus and learn the particular section 1705, bar 1710, or bars 1715, for example. As such, in some embodiments, the playback can also be controlled through a "reel screen", where every measure is segmented. In such embodiments, any audio the user has recorded can also be displayed on the screen in the measures in which it exists to allow the user to quickly find that audio and listen to their play of that session as graphed over the original audio data. In some embodiments, a "tape" can be graphically displayed to show the markings of the playback tracking bar. And, consistent with the teachings herein, a video display can complement the system, in some embodiments.

Figure 18:
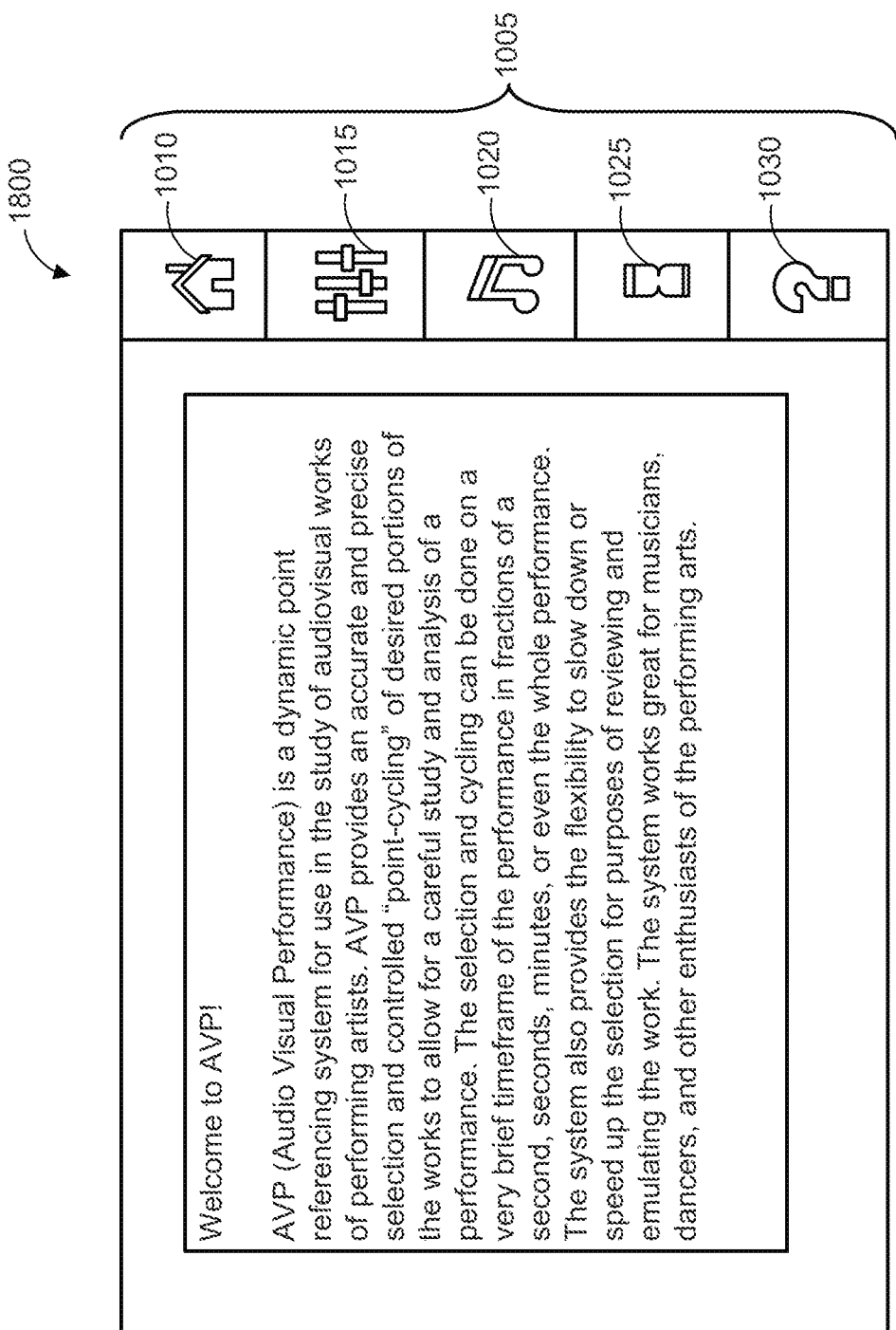
FIG. 18 illustrates a display for a graphical user interface offering a help page for the system, according to some embodiments.

The user may have questions, and as such, a help page is always useful. FIG. 18 illustrates a display for a graphical user interface offering a help page for the system, according to some embodiments. Help page 1800 is a simple depiction of information that a user can obtain from the system.

Figure 19:
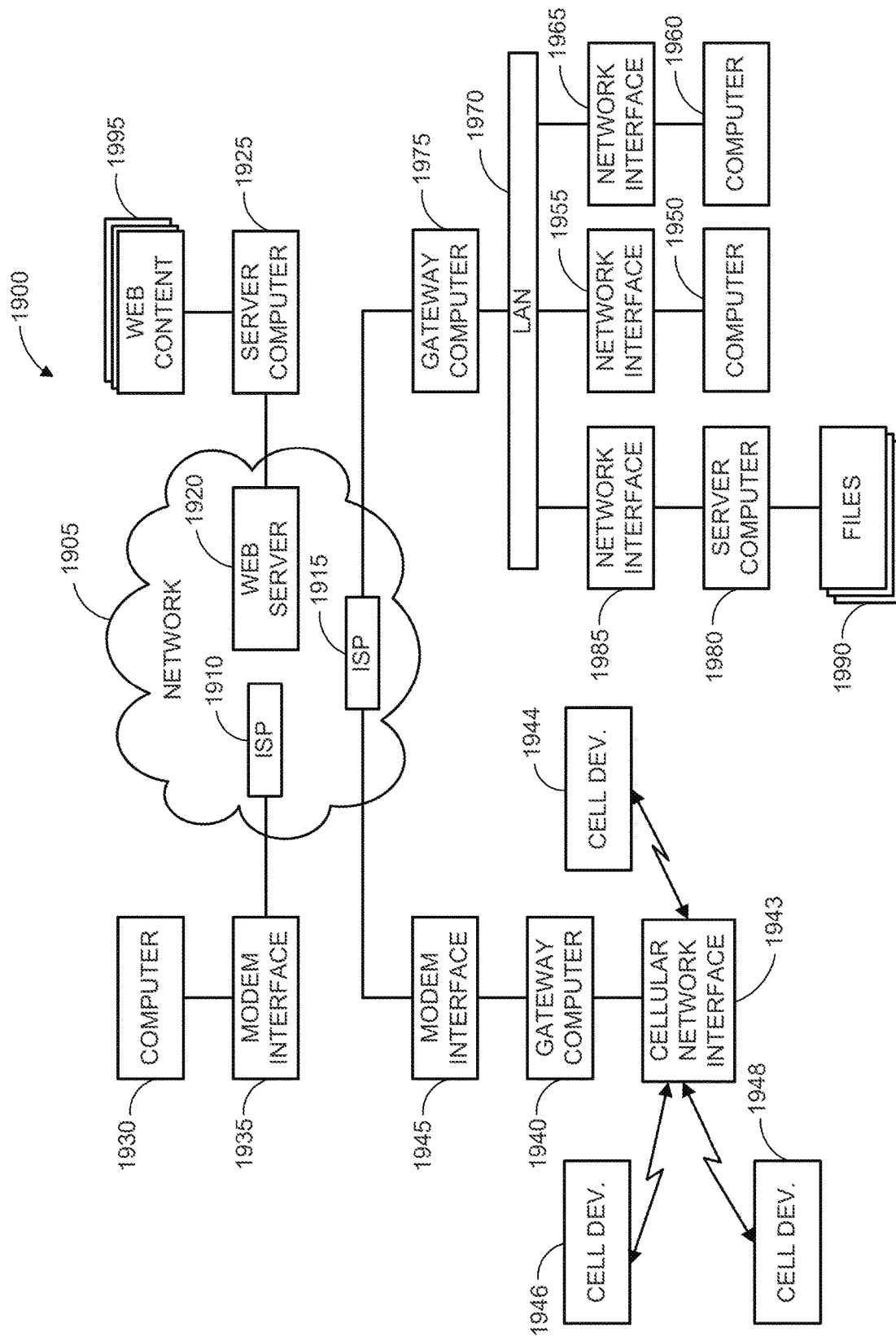
FIG. 19 shows how a network may be used for the system, according to some embodiments.

FIG. 19 shows how a network may be used for the system, according to some embodiments. FIG. 19 shows several computer systems coupled together through a network 1905, such as the internet, along with a cellular network and related cellular devices. The term "internet" as used herein refers to a network of networks which uses certain protocols, such as the TCP/IP protocol, and possibly other protocols such as the hypertext transfer protocol (HTTP) for hypertext markup language (HTML) documents that make up the world wide web (web). The physical connections of the internet and the protocols and communication procedures of the internet are well known to those of skill in the art.

Access to the internet 1905 is typically provided by internet service providers (ISP), such as the ISPs 1910 and 1915. Users on client systems, such as client computer systems 1930, 1950, and 1960 obtain access to the internet through the internet service providers, such as ISPs 1910 and 1915. Access to the internet allows users of the client computer systems to exchange information, receive and send e-mails, and view documents, such as documents which have been prepared in the HTML format. These documents are often provided by web servers, such as web server 1920 which is considered to be "on" the internet. Often these web servers are provided by the ISPs, such as ISP 1910, although a computer system can be set up and connected to the internet without that system also being an ISP.

The web server 1920 is typically at least one computer system which operates as a server computer system and is configured to operate with the protocols of the world wide web and is coupled to the internet. Optionally, the web server 1920 can be part of an ISP which provides access to the internet for client systems. The web server 1920 is shown coupled to the server computer system 1925 which itself is coupled to web content 1995, which can be considered a form of a media database. While two computer systems 1920 and 1925 are shown in FIG. 19, the web server system 1920 and the server computer system 1925 can be one computer system having different software components providing the web server functionality and the server functionality provided by the server computer system 1925 which will be described further below.

Cellular network interface 1943 provides an interface between a cellular network and corresponding cellular devices 1944, 1946 and 1948 on one side, and network 1905 on the other side. Thus cellular devices 1944, 1946 and 1948, which may be personal devices including cellular telephones, two-way pagers, personal digital assistants or other similar devices, may connect with network 1905 and exchange information such as email, content, or HTTP-formatted data, for example. Cellular network interface 1943 is coupled to computer 1940, which communicates with network 1905 through modem interface 1945. Computer 1940 may be a personal computer, server computer or the like, and serves as a gateway. Thus, computer 1940 may be similar to client computers 1950 and 1960 or to gateway computer 1975, for example. Software or content may then be uploaded or downloaded through the connection provided by interface 1943, computer 1940 and modem 1945.

Client computer systems 1930, 1950, and 1960 can each, with the appropriate web browsing software, view HTML pages provided by the web server 1920. The ISP 1910 provides internet connectivity to the client computer system 1930 through the modem interface 1935 which can be considered part of the client computer system 1930. The client computer system can be a personal computer system, a network computer, a web TV system, or other such computer system.

Similarly, the ISP 1915 provides internet connectivity for client systems 1950 and 1960, although as shown in FIG. 19, the connections are not the same as for more directly connected computer systems. Client computer systems 1950 and 1960 are part of a LAN coupled through a gateway computer 1975. While FIG. 19 shows the interfaces 1935 and 1945 as generically as a "modem," each of these interfaces can be an analog modem, isdn modem, cable modem, satellite transmission interface (e.g. "direct PC"), or other interfaces for coupling a computer system to other computer systems.

Client computer systems 1950 and 1960 are coupled to a LAN 1970 through network interfaces 1955 and 1965, which can be ethernet network or other network interfaces. The LAN 1970 is also coupled to a gateway computer system 1975 which can provide firewall and other internet related services for the local area network. This gateway computer system 1975 is coupled to the ISP 1915 to provide internet connectivity to the client computer systems 1950 and 1960. The gateway computer system 1975 can be a conventional server computer system. Also, the web server system 1920 can be a conventional server computer system.

Alternatively, a server computer system 1980 can be directly coupled to the LAN 1970 through a network interface 1985 to provide files 1990 and other services to the clients 1950, 1960, without the need to connect to the internet through the gateway system 1975.

Through the use of such a network, for example, the system can also provide an element of social networking, whereby users can contact other users having similar subject-profiles. In some embodiments, the system can include a messaging module operable to deliver notifications via email, SMS, and other mediums. In some embodiments, the system is accessible through a portable, single unit device and, in some embodiments, the input device, the graphical user interface, or both, is provided through a portable, single unit device. In some embodiments, the portable, single unit device is a hand-held device. In some embodiments, the systems and methods can operate from the server to a user, from the user to a server, from a user to a user, from a user to a plurality of users, in an MMO environment, from a user to a server to a user, from a server to a user (or plurality of users) and a teacher (or plurality of teachers), or a server to a plurality of users and a conductor, for example. The teachers or conductors can be either real-time teachers or conductors, simulated teachers or conductors, or recorded teachers or conductors, in some embodiments. The network can provide text and/or audio for real-time messaging, posting of messages, posting of instructional, posting of news or other items of a related interest to the users, and the like.

It should also be appreciated that a network can include traditional network media. For example, television cable, optical fiber, satellite, and the like, in which such digital information can be transmitted to users. Such use of traditional media will facilitate use of the teachings provided herein with traditional media entertainment channels, such as reality TV, amateur talent shows and competitions, and the like.

The following examples are illustrative of the uses of the present teachings. It should be appreciated that the examples are for purposes of illustration and are not to be construed as otherwise limiting to the teachings.

Example 1. Custom Mapping for the Instructional Musical Work

One of skill in the art of music production will understand that mapping is a skill obtained through experience and is not easy. There's nothing obvious about mapping, and there's no existing system that offers the custom mapping approach to instructional musical works, methods, and systems as taught herein. And, complex mapping can be used to provide a control for the transport of the learning artist to the desired portions of the musical works taught herein.

The easiest example of mapping can include the use of a transient or beat, for example, with drums, from the start to the end of a musical work. The skilled artisan could identify a first beat and map it with subsequent beats, such as first kick, then a first snare, a second kick, and then a second snare, representing one bar in quarter notes. That's a simple tempo map.

The tempo map is based on "distance" that is measured in time between bars, or sometimes between beats, e.g., in milliseconds. The distance between bar 1 and bar 2 could be, for example. 119.5 beats per minute, between bar 2 and bar 3 could then be 119.38 beats per minute, where the skilled artisan can capture subtle fluctuations in tempo. The capturing of such fluctuations, whether subtle or not, allows for a mapping that allows a learning artist to locate exactly where the beat is, e.g. a downbeat or an upbeat.

What if there are no drums? For this purpose, the skilled artisan could use another instrument, such as a guitar, in search of a downbeat and upbeat, for example. Many musical transients may provide a means for identifying quarter notes, eighth notes, etc, using any point of reference known to one of skill, and the choice depends on the complexity of the work or the tempo.

What if no tempo at all for some time, such as 8 bars? In this case, the skilled artisan could take the last beat of a section and the first beat of a following section and measure the distance between the selected beats.

What if song starts with an ad-lib vocal with no time reference at all? In this case, the skilled artisan could look at the overall tempo of a song, and then use expert interpretation to select a tempo, followed by an iterative process that includes, for example, manually shuffling, adjusting, and laying-out the map.

Tempo mapping functions that are available through PROTOOLS or other software programs do not provide preconfigured custom tempo mapping sets that will easily and automatically align to any given song as taught herein within. As will be appreciated by one of skill, as well as the learning artist, a predefined custom tempo map can provide a quick and easy solution that provides accuracy and precision not otherwise available.

Example 2. The Use of the Audio Tempo Mapping to Index a Corresponding Video Portion This example illustrates how to implement the teachings herein to an audiovisual musical work.

Overdubbing to a Master Recording

This example shows how to use the methods provided herein combining the audio track derived from a classic multi-track master recording, and the audio/video performance of an instructor. Our example uses the original multi-track audio from Jimi Hendrix' "Purple Haze" and an audio/video performance of modern guitar legend Steve Vai demonstrating Jimi's technique.

The original multi-track master tapes were transferred to high quality multi-track audio files and mixed to sound indistinguishable from the original version of the song. The original guitar performance and the accompanying band track are both exported separately as stereo audio files so that the user will have discrete volume level control over these elements. Using these isolated audio components, a dynamic point reference is constructed as described herein. By utilizing the individual instrument tracks from this original multi-track recording, the dynamic point reference is created using a variety of notes, beats, and transients.

Steve Vai enters the audio/video studio where his rendition of the classic Jimi Hendrix song will be recorded with multiple camera angles and high quality audio recording equipment. In addition to the band track (with original guitar removed, for example, using the teachings described herein and in U.S. Pat. No. 7,902,446, which is hereby incorporated herein in its entirety by reference), Mr. Vai will use the dynamic point reference as an accurate audio guide to perform his guitar in sync with the original band track. Either the audio/video recording of Steve or the audio of the Hendrix song may benefit from very subtle editing to match the 2 audio tracks in certain sections that will be very pleasing to the user.

Taking the finished and edited audio/video files of the performance and authoring it in sync with the original Hendrix tracks, the user can choose the desired camera angle for video playback and adjust the audio playback levels of the band audio track, Steve Vai's performance audio track, the original Hendrix audio track and the metronome click track (directly derived from the dynamic point reference). A user can now select a desired portion of the video to emulate, and the user's selection will automatically move to the nearest cycle point and begin cycling through the selection. The cycling, for example, can be further defined by a default cycle point selection which might be 2 beats, 1 bar, 2 bars or an entire section such as a verse, chorus, or the entire song. The dynamic point reference provides the point cycle feature with the information it needs so the user can quickly select a desired section of the audio/video and watch the same performance over and over again, and can do so with the synchronized audio cycling. In this way, the user can very quickly learn every technique that Steve Vai demonstrated on the Hendrix song. The user can select a small 1 bar section with the point cycle feature turned on in advance and as the section is perfected, the user can select the next closest start point or end point allowing the user the ability to change his start and end selection quickly and proficiently to the next closest cycle point at the beginning or ending of the current selection. The user will benefit from the ability to slow down the speed of the audio/video performance as desired without changing the pitch of the audio and examine the detail and nuances of Steve Vai performing his rendition of Purple Haze. As such, this allows the user to emulate this performance in slow motion with a great degree of detail and confidence and, once mastered, the user may now be able to emulate the performance at regular speed.

Example 3. Virtuoso Performance

This example shows how to use the methods provided herein with extremely complex songs by a virtuoso performer learning to play the most challenging compositions. Typically, songs of this nature lend themselves to a more detail-oriented learning experience as compared to more simple forms of music. The dynamic point reference as described herein and the use of multiple camera angles showcasing hand position, posture, instrument handling, and other pertinent performance details can be observed once a dynamic point reference as described herein is applied to any format of audio files using point cycling and extremely slow speed adjustments until the difficult section is mastered and perfected. The user could plug his instrument into the user-defined recordable track where he will emulate the virtuosic performance.

Example 4. Variable Point Reference Over a Steady Click

This example shows how to use the methods provided herein can be used with a constant tempo that never changes. A dynamic point reference as described herein can be derived from an audio/video performance that originated against a constant tempo generated from a drum machine or computer music program. It may be desirable to add a new section at a new tempo before during or after the existing audio/video with a consistent rhythm. It may be desirable to construct an introduction for an audio/video performance where the tempo starts very slow (50 beats per minute) and gradually speeds up to the constant tempo which could be 120 beats per minute. This same concept could be applied and attached to the end of an audio/video performance where the tempo slowing changes from the constant tempo of 120 beats per minute back to the original 50 beats per minute at the start. The dynamic point reference makes it possible to cycle the introduction section that is slowly speeding up, the main section that is at a constant tempo, or the newly constructed ending that is gradually slowing down. The user could also plug his instrument into the useable recordable track where he will record his own performance.

Example 5. Classical Performance with a String Quartet

This example shows how to use the methods provided herein with an accomplished classical string quartet. There are many physical techniques that are specifically relevant to classical musicians who play instruments like violin, viola, cello, contra bass etc. A string player's vibrato, bowing, positioning, hand placement and many other factors that happen very quickly by the accomplished string player are very difficult to comprehend due to the speed and complexity of many difficult musical pieces. However, these nuances and articulations can easily be observed through an audio/video system that allows a learning musician to point cycle the desired sections of a song utilizing the dynamic point reference as described herein. Once the cycle point is selected at the desired section, the proper camera angle is selected and the speed is adjusted slow enough to see and hear the desired section, it is possible to emulate the performer very accurately while practicing the selection over and over until the user can adjust the speed back to its original state and play it with confidence and dexterity. This is a very useful feature that can accelerate the user's ability as the performer can motivate the user when a teacher is not available or during practice sessions in between one-on-one lessons with a teacher. Any of the four instruments of the string quartet can benefit from this cycling method and slow speed option.

Example 6. Teacher/Student Musical Instruction

This example shows how to use the methods provided herein with a musical instructor or teacher and a user who is the student. Hiring a teacher who specializes in one-on-one student instruction can be expensive and many students cannot afford more than 1 or 2 lessons per week. Teachers will commute to the students house or the student will travel to the teachers house or studio, or in some cases a school. Personal one on one instruction allows a teacher to give immediate feedback to the student. The teacher may give the student assignments and songs to practice and perfected until the next lesson and many times the student will practice bad habits and make the same mistakes over and over again until the next lesson when the teacher points out the mistakes.

The dynamic point reference as described herein and the use of multiple camera angles showcasing hand position, posture, instrument handling, and other pertinent performance details, combined with multi-track audio files with isolated instrument tracks offers the student a solution for this problem. Using the dynamic point reference as described herein, the student can methodically use the point cycling for each bar of a song from start to finish using any of the camera angles and listening to the audio at regular speed or slowing the tempo to assist in the learning process. The student has a video and audio reference to help reduce the chances of practicing the same mistakes over and over again until corrected by the teacher at the next in person lesson.

The teacher can recommend content for the student or the teacher can produce his own content and be the performer in the audio/video content that is used by the student. A portable tablet device for example an Apple ipad or Android based device is a great platform for the methods provided herein. Using any of the popular analytics tools currently available combined with the methods provided herein, a teacher could track a student's progress in detail during the times in between lessons. For example, a teacher could get reports remotely through a network or internet that give details of how often the student practices in general, which songs are being practiced and the length of time of practice per song.

Specific details can also be examined as a diagnostic, for example, identifying the sections of the song that the student is practicing using the point cycling and slowing down the tempo. This is valuable information that a teacher can use to recommend certain exercises for dexterity, fingering or other exercises to help the student obtain the skills required for the problematic sections. The student can also use the recording function to make an audio/video compilation, or just the audio portion or video portion separately to post on a server or directly email to the teacher. The teacher can choose to listen to the student's performance streaming from a server, or import the file locally to the teachers tablet or computer, and like the student, can use the point cycling and slow the tempo to make very accurate observations about the student's performance. The audio will assist the teacher for grading the correct notes being played or, in the case of a singer, the teacher can analyze the pitch and other nuances. The video will assist the teacher to help determine many performance-related issues. For example, if the student is playing piano, determining whether the fingering is correct. Likewise, if the instrument is a violin, the teacher could observe the vibrato or the position of the fingering. Vocal students could be observed for breathing and the shape of the mouth during certain sections. Many of these examples could also be applied to dance, where the teacher could not only monitor how often, and what sections, the student is practicing in addition to the recording and uploading or emailing of performance data for the teacher to evaluate.

Example 7. The Learning Artist is a Member of a Band or Orchestra Performing Together "Virtually"

One of skill will appreciate that the systems and methods taught herein can be provided in a streaming audio/video setting in which members of a band or orchestra can play together in a virtual setting, in which the conductor can be a streaming video portion that is indexed, consistent with the teachings provided herein, to an audio track. As with the other embodiments taught herein, the audio track used for the indexing can be any audio track and, in some embodiments, a percussion audio track can be used. As such, each virtual member of the band or orchestra can be located in an independent remote setting, for example, such as their home or other local venue, and the members can use an internet setting to perform together. The combined performances can be recorded and analyzed by the band or orchestra in a manner similar to that of a group setting with the exception that the recording can also offer an accurate and precise selection of a desired portion of the recorded work, also having the ability to cycle the portion for analysis and study of the work at a high resolution.

Regardless of the information presented, the system exemplifies the broader concept of an accurate and precise digital audio/video instructional system. The system can provide a powerful and unique learning experience and, in some embodiments, it can process multimedia in the form of text, images, video, and sound. In some embodiments, the user can customize the system, such as choosing interfaces, colors, language, music preferences and categories, etc. The user is allowed to enter preferences into the system in order to customize visual displays that present the information the user in a personalized way. In some embodiments, the system includes a multimedia interaction of one or more of text and video; sound and diagrams, pictures, or images; sound; and video. In some embodiments, the system and it's database can include any of a variety of system libraries that contain organized sets of any of a variety of information of value to users. Moreover, can information can be obtained from external data sources, whereby plug-ins and APIs can be designed to allow integration with third party systems and exchange data with external data sources. The external data sources can be used to provide information on demand, to update existing information stored in the system libraries, or both. Some portions of the detailed description are presented in terms of operations of the system. The operations are those requiring physical manipulations of physical quantities resulting in a useful product being produced. In other words, a transformation is occurring, in some embodiments. In some embodiments, the transformation can be particular to the use of a particular machine or apparatus designed for that transformation. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. All of these and similar terms are to be associated with the appropriate physical quantities and are merely convenient labels applied to these quantities. Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover, the teachings relate to a system for performing the operations herein. This system may be specially constructed as an apparatus designed solely for the required purposes, or it may comprise a general purpose computer selectively activated or reconfigured by a computer program stored in the computer. Such a computer program may be stored in a non-transitory computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. It should also be appreciated that, in some embodiments, the methods and displays presented herein are not necessarily inherently related to any particular computer or other apparatus. Various general purpose systems may be used with programs in accordance with the teachings herein, or it may prove convenient to construct more specialized apparatus to perform the methods of some embodiments. The required structure for a variety of these systems will be apparent to one of skill given the teachings herein. The law currently limits claims to those that do not claim signals, and so the teachings are directed to non-transitory computer readable media as per current practice. However, should the law change and rule that claims can include signals, some embodiments can also include a system comprising signals, such as wireless signals of RF devices, for example. In addition, the techniques are not described with reference to any particular programming language, and various embodiments may thus be implemented using a variety of programming languages. Accordingly, the terms and examples provided above are illustrative only and not intended to be limiting; and, the term "embodiment," as used herein, means an embodiment that serves to illustrate by way of example and not limitation.

Example 8. The Learning Artist is a Dancer

This example illustrates how the learning artist can be a dancer. Like the performance of music, the performance of dance can also include subtleties in movements that create a unique, pleasing, or otherwise desirable expression. As a musician may have difficulty identifying and mastering a subtlety in the playing of a desired portion of a musical work, the dancer may have a similar difficulty identifying and mastering a subtlety found in dancing with the desired portion of the musical work. Using the teachings provided herein, the dancer can accurately and precisely select the desired portion of the musical work that correlates with a likewise accurate and precise video display of the dancing moves associated with the desired portion that the dancer wants to learn. The dancer can cycle that portion at a range of tempos that match the dancer's skill level, repeating the movements until learned to the dancer's satisfaction. This tool can be used by the beginner or expert dancer in learning all or any portion of a dance.

Figure 9:
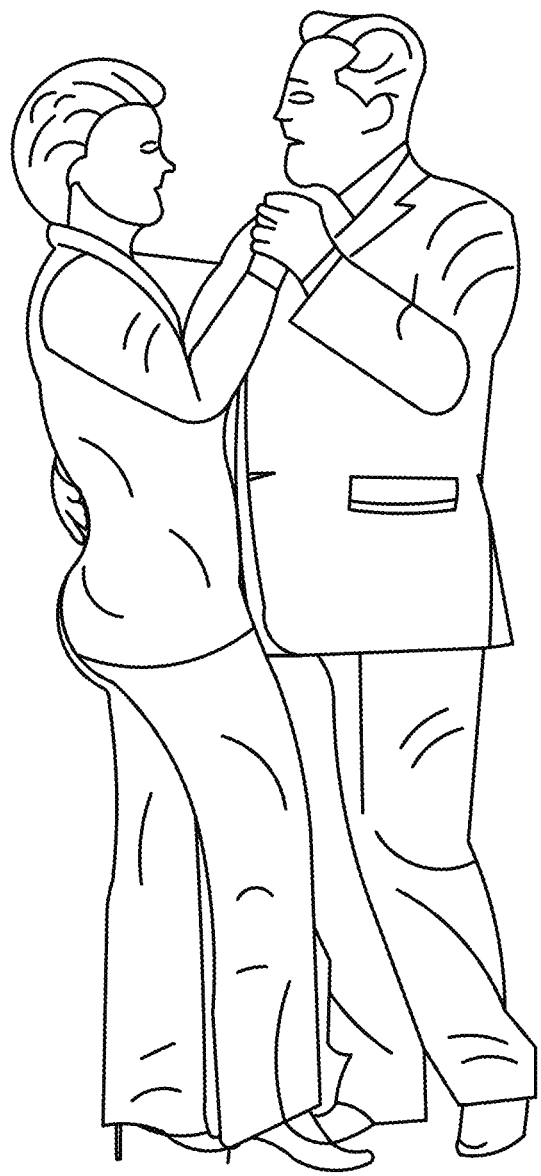
FIG. 9 illustrates a view of a couple dancing in an audio/video dancing demonstration, according to some embodiments.

FIG. 9 illustrates a view of a couple dancing in an audio/video dancing demonstration, according to some embodiments. Many adults enjoy ballroom dancing as a form of entertainment, and some take it quite seriously. A state-of-the-art method of learning ballroom dancing, for example, typically involves either purchasing a diagram of dance steps that you can follow-by-number, attending a dancing class in a local forum, or some combination of these methods. Currently, there is no existing method by which dancers can obtain an indexed version of a musical work that can be accurately and precisely parsed, and adjusted for a desired tempo; the musical work also having a likewise parseable, indexed video demonstration of the dance steps that they are trying learn.

Classic Audio/Videos Performance

This example shows how to use the methods provided herein using a vintage audio/video performance where the audio is a single track mono or 2 track stereo source that was recorded on the analog audio channel of the video recorder or recorded on an external device synchronized to the video recording unit. This example, in particular, uses a performance of Elvis Presley performing on a television show in the late 1950's where the mono audio source is used to construct the dynamic point reference as described herein.

The audio/video file is transferred from its original analog source to a computer and the audio file is used to construct the dynamic point reference by using a variety of notes, beats and transients combined with visual cues from the video; for example: body movements providing a dynamic reference point if the audio is damaged or non-existent. Once constructed, the dynamic point reference knows where the desired beats are located, and a count-off can be constructed using an average cycle point calculation from the first few bars with a defined rhythm.

The user can utilize the point cycling feature while the audio/video is playing and if the default setting is 1 bar, the point cycling will automatically begin and snap to the nearest bar and repeat the 1 bar selection. The point cycling automatically adjusts to the nearest cycle point and cycles through a pre-defined cycle length that can be a user setting preference in the setup menu. A user can manually choose any length of cycling, for example, an entire section such as a verse, chorus, or the entire song. Once the user defines the cycle length it can be viewed over and over again with the synchronized audio, and slow down the tempo making it easier for the user to learn every move or nuance just the way Elvis performed it that night on television. The user can easily change the start and end cycle point and move to the next closest cycle point at the beginning or end of the current selection.

The user will appreciate the ability to slow down the speed of the audio/video performance as desired without changing the pitch of the audio and examine the detail and nuances of Elvis on stage performing his classic moves, allowing the user to emulate this famous performance in slow motion with a great degree of detail and confidence. Once perfected, the user can change back to the normal speed and repeat this procedure until the performance can be emulated to the user's satisfaction.

Modern Solo Freestyle

This example shows how to use the methods provided herein for professional and aspiring dancers for modern electronic beat-infused music that has unexpected tempos, start and stops and recorded live through a multi-channel audio recorder and an independent and separate video recorder. In this example, the audio and video are recorded on separate devices and synchronized to an external clock source such as SMPTE time code developed by the Society of Motion Picture and Television Engineers. The video and audio are later synchronized in the mixing process using a synchronization device and time code such as SMPTE.

The multi-track audio source is used to construct the dynamic point reference as described herein. The audio content on the many different tracks that make up the multi-track recording offer many different beats and timing references to construct the dynamic point reference. A variety of notes, beats and transients are used in the construction of the dynamic point reference and can be combined with visual cues from the video, if helpful, for example, in a case where the audio is damaged or lacks an obvious dynamic point reference. Once constructed, the dynamic point reference detects where the desired beats are located and a count-off can be constructed using an average cycle point calculation from the first few bars of a defined dynamic point reference and inserted before the start point of the song. This inserted piece can be overlapped with the first bar to help ensure a good dynamic point reference.

A user can employ the point cycling feature while the video is playing and select the cycle points that are desirable to emulate. The point cycling automatically adjusts to the nearest cycle point and cycles through a pre-defined cycle length that can be a user setting preference in the setup menu. Complicated rhythmical dance techniques are easily repeated using point cycling at slower speeds and user-selectable intervals to absorb challenging routines. These dance sequences can be viewed at various camera angles allowing the user to see the performance from different perspectives that can be desirable as many dancers use mirrors at different angels while rehearsing new material. The point cycling feature allows a user to find the desired angle while the track is cycling the selection over and over.

Couples Dance

This example shows how to use the methods provided herein for traditional dancing that has become very popular with TV shows like Dancing with the Stars where couples dance competitively. The dynamic point reference as described herein would be greatly beneficial for someone who would like to learn Tango, Salsa, Ballroom or any one of the popular dance styles. Point cycling of any portion of popular dance would be invaluable to an aspiring dancer to learn, practice and control the viewing options. Point Cycling and the ability to slow the tempo of any section will help to master the techniques of any dance style. Users can view the exact body movements at the optimum point of view that is most conducive to learning.

The user can employ the point cycling feature to select favorite movements or problematic and hard-to-learn sections using the speed control feature that allows the user to slow the selected section down. The audio not only retains the same pitch, the video is always in sync with the music which is the pulse that drives the dancer. This method will accelerate the learning process for both dancers but will also allow each dancer to work independently when they are not together for practice.

Choreographed Dance Groups

This example shows how to use the methods provided herein using a choreographed dance group like a Broadway musical or a modern dance ensemble. A top choreographer is hired to produce a series complex dance routines that are set to music that has many fluctuations in tempo which he will demonstrate while being recorded with a high quality audio/video recorder and a music play back system generating sound from a pair of speakers in the room so he can hear the music and is also recorded by the video/audio recorder. He performs each complex dance routine and the audio/video performance is transferred to a computer and the audio file is used to construct the dynamic point reference as described herein.

Once completed, the finished content will be authored to a portable tablet computer for use during production of a 25 piece dance ensemble. The leader of the dance ensemble gives each of the 25 dancers a tablet with the complex audio/video dance piece and places them on a stand in front of the dancers. Each of the 25 tablets are set to external sync mode and controlled by the leader or the choreographer who controls each or the 25 devices from his master device by a wireless network.

The leader or the choreographer is now controlling each dancer's tablet, selecting cycle points of any section of the complex dance routine and, where necessary, slowing down the tempo during the difficult sections allowing each dancer to watch and practice together with the entire 25 piece ensemble. Each dancer can also take his/her tablet home to practice the dance routine using the point cycle feature to practice the difficult sections of the dance piece, record a digital video of themselves to compare to the performer that they are emulating. This example shows how the methods provided herein can dramatically save time for a large group of dancers to learn a complex dance piece for a Broadway show, Las Vegas review or any performance by a group of dancers.

Avant Garde Routine

This example shows how to use the methods provided herein for an abstract audio/video dance routine which may be rehearsed and performed with ethereal music soundtracks that lack the strong beat definition that exists in other forms of music. In cases like these, dance moves need to be mapped based on the performer's motion as opposed to the music itself. The variable point reference is derived from the rhythm or selected visual cues of the dancer yet still in sync with the accompanying music. User-selected segments of the performance can utilize the point cycling and also be slowed down to intuitively learn the exact movements in relation to the internal rhythm of the performing dancer.

Example 9. The Learning Artist is a Contestant in a Performing Arts Contest, and the Systems Taught Herein can be Used by the General Public in Rating the Performers The use of the system can be applied in several forums. Some members of the general public, for example, may have an interest in observing a musical performance or dance performance. The media has identified a strong interest in the public with regard to rating such performances. Examples of such forums include, but are not limited to, American Idol, Dancing with the Stars, and America's Got Talent, to name only a few. New versions of such television shows appear to continue development by the major networks. The systems, methods, and datafiles provided herein can be used by the networks that produce the shows and present them to the general public, for example, to offer the public with a way to further enjoy and rate performances. A user could download a particular performance or set of performances and compare them for purposes of analyzing the performances and voting for their favorite performance.

We claim:

1. A method of facilitating a social network of a group of performers through an accurate and precise audiovisual process that occurs in a distributed computing environment having remote processing devices linked through a communications network in a streaming audio/video setting, the method comprising:

providing the group of performers with a community within which they share a musical performance; wherein a performer in the group of performers follows a process that includes obtaining an audiovisual work having an audio portion having a fluctuation in tempos, a video portion having a video performance of a performer displaying combinations of movements of the performer that follow the audio portion, and a dynamic point reference grid having a custom tempo map of the audio portion for selecting a desired portion of the audiovisual work;

selecting a point of reference in the desired portion of the work, the point of reference defined by the dynamic point reference grid;

emulating the performance; and, point-cycling the desired portion;

wherein, the custom tempo map is configured to include a mapping of the distance between bars or beats, the distance measured as time; where, the mapping captures the fluctuation in tempos and composes the dynamic point reference grid for an accurate and precise selection of a point of reference for the point-cycling of the desired portion of the work; and, the emulating of the musical performance occurs in the distributed computing environment having remote processing devices linked through the communications network in the streaming audio/video setting; and, displaying a player rating by which the group of performers compare performances in the social network.

2. The method of claim 1, wherein the musical performance includes a musical instrument.

3. The method of claim 1, wherein the musical performance is a dance performance.

4. The method of claim 1, wherein the musical performance is a vocal performance.

5. The method of claim 1, wherein the rating is a voting by the social network.

6. The method of claim 1; wherein, the audiovisual work has a multi-track audio file derived from a multi-track audio recording;

the multi-track audio file comprises an isolated instrument audio track and a residual component track, the isolated instrument audio track comprising a single performer performing a preselected piece of music that the user desires to hear when analyzing or emulating the performance;

the emulating includes transforming the composition of the multi-track audio file to include selecting a gain ratio of volumes of (i) the isolated instrument audio track to (ii) the residual component track, wherein the residual component track represents a subtraction of the isolated instrument audio track from the plurality of audio tracks; and, selecting the desired portion, watching the video, listening to the isolated instrument audio track in the desired portion, and emulating the desired portion.

7. The method of claim 6, the method further comprising: recording an emulated video track on a non-transitory computer readable storage medium;

combining the user's video track with the residual component track to create an comparison audio file; and, comparing the emulated video track to that of the performer's video track.

8. The method of claim 1, wherein the method further comprises emulating the audio portion which is controlled and indexed through the custom tempo map.

9. The method of claim 1, wherein the desired video portion includes a musical note, a plurality of beats, a bar, a plurality of bars, a repeating rhythmic pattern, or any combination thereof, of the isolated instrument audio track.

10. The method of claim 1, wherein the player rating is graded by a host or celebrity.

11. The method of claim 1, wherein the audio portion further comprises an audible dynamic point reference track, the method comprising listening to the audible dynamic point-reference track that is designed for the preselected piece of music.

12. The method of claim 1, wherein the desired portion plays back at a desired speed that matches the ability of the user.

13. An audiovisual system for facilitating a social network of a group of performers that occurs in a distributed computing environment having remote processing devices linked through a communications network in a streaming audio/video setting, the system comprising:

a distributed computing environment having remote processing devices linked through the communications network in the streaming audio/video setting;

a processor;

an input device operable to receive audio and video data on a non-transitory computer readable storage medium;

a database operable to store audiovisual files for access on a non-transitory computer readable storage medium;

an audio engine embodied in a non-transitory computer readable storage medium, wherein the audio engine is operable to transform input audio data to output audio data;

a video engine embodied in a non-transitory computer readable storage medium, wherein the video engine is (i) operable to transform input video data to output video data having a video track displaying the combinations of movements that follow the audio portion and (ii) configured to display an indexed version of the video track that can be accurately and precisely parsed, and adjusted for a desired tempo;

a dynamic point reference module embodied in a non-transitory computer readable storage medium, wherein the dynamic point reference module is operable through a custom tempo map to create a dynamic point reference grid for a video performance having a video portion and an audio portion, the dynamic point reference grid indexed to the custom tempo map of the audio portion, the audio portion comprising a recording of a performance having a fluctuation in tempos;

an output module embodied in a non-transitory computer readable medium, wherein the output module is operable to (i) transmit the audio data and the video data to an output device in the form of an accurate and precise selection of a desired portion of the video track, (ii) transmit a point-cycling of the desired portion of the video track to a user, and (iii) display a player rating through a community share function for use by the social network to compare skill levels; and, the output device operable to provide the audio data and the video data to the user;

wherein, the custom tempo map is configured to include a mapping of the distance between bars or beats, the distance measured as time; where, the mapping captures the fluctuation in tempos and composes the dynamic point reference grid; and, the emulating of the musical performance occurs in the distributed computing environment having remote processing devices linked through the communications network in the streaming audio/video setting.

14. The system of claim 13, wherein the system is configured for a band or orchestra to play together as a group in a virtual setting.

15. The system of claim 13, wherein the system is configured for a dance group to dance together in a virtual setting.

16. The system of claim 13, wherein the system is configured to allow each member of the group to be located in an independent remote setting using an internet setting to perform together.

17. The system of claim 13, wherein the dynamic point reference is constructed to include a transient in the custom tempo map representing a point of silence as a reference point for the point-cycling of the desired portion.

18. The system of claim 13, further comprising
a transformation module embodied in a non-transitory computer readable storage medium, wherein the audio portion comprises a multi-track file having an isolated instrument audio track and a residual component track, and the transformation module is operable to transform the audio portion into a ratio of (i) the isolated instrument audio track to (ii) the residual component track, the residual component track representing a subtraction of the isolated instrument audio track from the multi-track file, and the transforming resulting from a user selecting a gain ratio of volumes between the isolated instrument audio track and the residual component track;
an emulation recording module embodied in a non-transitory computer readable storage medium, wherein the emulation recording module is operable to record an emulated video track;
an integration engine embodied in a non-transitory computer readable storage medium, wherein the integration engine is operable to combine the emulated video track with the audio track.

19. The system of claim 13, wherein the input device comprises a microphone and a camera, and the output device comprises a speaker and a graphical user interface.

20. The system of claim 13, wherein the output module transmits music transcription and tablature data to a graphical user interface, the music transcription and tablature data reflecting the fluctuation in tempos from the multi-track audio file.

21. The system of claim 13, wherein the output module has a recalibration function operable to recalibrate an audio data track output to adjust tempo in the output of the audio track data.

22. The system of claim 13, wherein the output module has a synchronization function operable to synchronize the music transcription and tablature data display on the graphical user interface with the isolated instrument audio track provided to the listener through the speaker.

23. The system of claim 18, wherein the multi-track audio file further comprises an audible dynamic point reference track, and the transformation module is operable to transform the multi-track audio file into a gain ratio of (i) the isolated instrument audio track, (ii) the residual component, and (iii) the audible dynamic point reference track.

24. The system of claim 13 further comprising a data exchange module embodied in a non-transitory computer readable medium, wherein the data exchange module is operable to exchange data with external computer readable media.

25. The system of claim 13, wherein the player rating is a measure of a voting process.

26. The system of claim 13, wherein the system is configured to display a set of emulated performances for the user to compare them for purposes of analyzing the performances.

27. The system of claim 13, wherein the system includes a custom tempo map to reflect the variable and unpredictable tempo changes of an original, multi-track master recording.

28. The system of claim 13, wherein the system has an external choreographer control configured to allow a choreographer to (i) select a section of the performer's video track to point cycle or (ii) select a tempo for the performer among the group of performers to follow in the process of learning a performance.

29. The system of claim 24, wherein the system is configured to include a voting or rating function for the user in analyzing the performance and transmitting the voting or rating using the data exchange module to the external computer readable media.

30. The system of claim 13, wherein the system consists of a game console apparatus.

* * * * *